(12) United States Patent
Cho et al.

(10) Patent No.: US 9,078,186 B2
(45) Date of Patent: Jul. 7, 2015

(54) METHOD OF TRANSMITTING AND RECEIVING DATA IN A MULTI RADIO ACCESS TECHNOLOGY SYSTEM USING AN ACCESS POINT AND APPARATUS THEREFOR

(75) Inventors: Heejeong Cho, Anyang-si (KR); Jin Lee, Anyang-si (KR); Eunjong Lee, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 13/880,190

(22) PCT Filed: Oct. 20, 2011

(86) PCT No.: PCT/KR2011/007842
§ 371 (c)(1),
(2), (4) Date: Apr. 18, 2013

(87) PCT Pub. No.: WO2012/053842
PCT Pub. Date: Apr. 26, 2012

(65) Prior Publication Data
US 2013/0208701 A1  Aug. 15, 2013

Related U.S. Application Data

(60) Provisional application No. 61/394,779, filed on Oct. 20, 2010, provisional application No. 61/418,410, filed on Dec. 1, 2010.

(30) Foreign Application Priority Data

Oct. 20, 2011 (KR) .................. 10-2011-0107314

(51) Int. Cl.
*H04L 12/28* (2006.01)
*H04W 36/08* (2009.01)
(Continued)

(52) U.S. Cl.
CPC ............ *H04W 36/08* (2013.01); *H04W 76/023* (2013.01); *H04W 88/04* (2013.01); *H04W 88/10* (2013.01)

(58) Field of Classification Search
None
See application file for complete search history.

(56) References Cited

U.S. PATENT DOCUMENTS

| 2008/0192686 A1* | 8/2008 | Cho et al. ................ 370/329 |
| 2010/0111053 A1* | 5/2010 | Avital et al. ............. 370/338 |
| 2010/0254308 A1* | 10/2010 | Laroia et al. ............ 370/328 |

FOREIGN PATENT DOCUMENTS

KR   10-2009-0029479   3/2009

OTHER PUBLICATIONS

Jung, et al., "Study Report on Hierarchical Networks (Working document)," IEEE 802.16 Broadband Wireless Access Working Group, IEEE 802.16ppc-10/0008r1, Sep. 2010, 23 pages.

(Continued)

*Primary Examiner* — Kevin C Harper
(74) *Attorney, Agent, or Firm* — Lee, Hong, Degerman, Kang & Waimey

(57) ABSTRACT

The present invention relates to a wireless communication, and more particularly, to a method for a base station and a user equipment to transmit and receive data in a multi radio access technology system based on an access point (AP) and apparatus therefor. According to one embodiment of the present invention, a method of performing a communication, which is performed by a user equipment based on an access point (AP) supporting a Multi-RAT (Radio Access Technology), may include the steps of receiving an information on a 1st AP associated with the user equipment among a plurality of APs from the 1st AP, transmitting the information on the 1st AP to a base station, receiving an information on at least one cooperative user equipment candidate associated with the 1st AP from the base station, and transmitting a 1st data to the base station using the at least one cooperative user equipment, wherein the 1st data is exchanged between the user equipment and the at least one cooperative user equipment via a 1st radio access scheme and wherein the 1st data is exchanged between the at least one cooperative user equipment and the base station via 2nd radio access scheme.

14 Claims, 21 Drawing Sheets

(51) Int. Cl.
*H04W 88/04* (2009.01)
*H04W 76/02* (2009.01)
*H04W 88/10* (2009.01)

(56) References Cited

OTHER PUBLICATIONS

Jung, et al., "Comments and Text proposal on Study Report on Hierarchical Networks," IEEE 802.16 Broadband Wireless Access Working Group, IEEE 802.16ppc-10/0062r2, Sep. 2010, 17 pages (relevant portions: sections 2.2, 3.2, 5.2, and Figs. 6-7).

Johnsson, et al., "Client Cooperation in Future Wireless Broadband Networks," IEEE 802.16 Presentation Submission Template (Rev. 9), IEEE C802.16-10/0005r1, Jan. 2010, 16 pages.

Kim, et al., "Contribution for Hierarchical Network Study Report," IEEE 802.16 Broadband Wireless Access Working Group, IEEE C802.16ppc-1010044, Jul. 2010, 9 pages.

Kim, et al., "Study Report on Hierarchical Networks (Working document)," IEEE 802.16 Broadband Wireless Access Working Group, IEEE 802.16ppc-10/0008, Jul. 2010, 14 pages (relevant portions: sections 2.2 and 3).

PCT International Application No. PCT/KR2011/007842, Notification of Transmittal of the International Search Report and the Written Opinion of the International Searching Authority, or Declaration dated Apr. 4, 2012, 9 pages.

* cited by examiner

Fig. 3
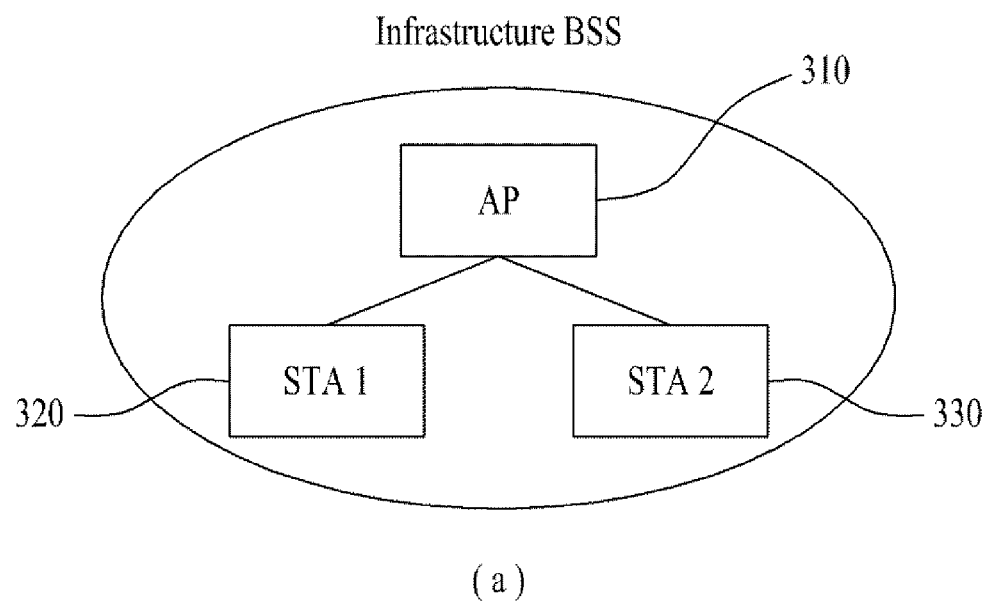
(a)
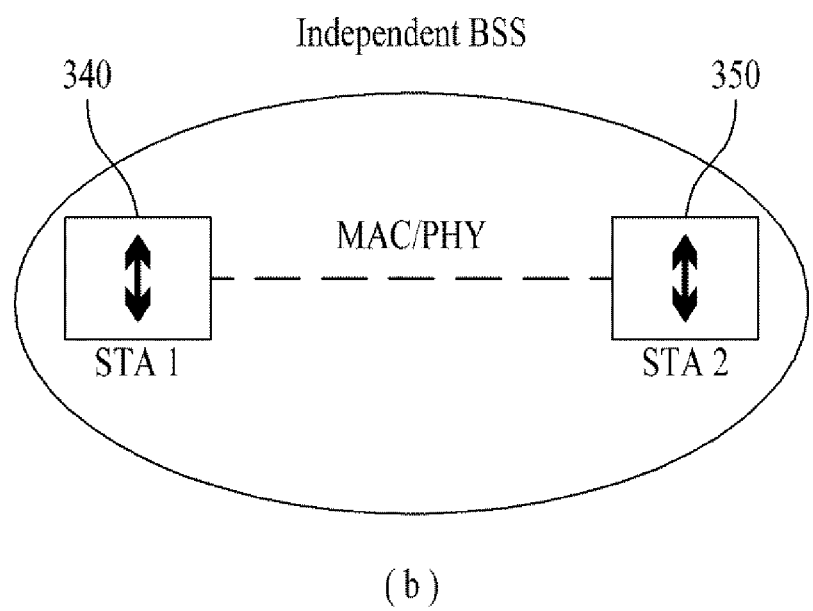
(b)

Fig. 13a

Beacon frame body

| Order | Information | Notes |
|---|---|---|
| 1 | Timestamp | |
| 2 | Beacon interval | |
| 3 | Capability | |
| 4 | Service Set Identifier (SSID) | |
| 5 | Supported rates | |
| 6 | Frequency-Hopping (FH) Parameter Set | The FH Parameter Set element is present within Beacon frames generated by STAs using FH PHYs. |

Fig. 13b

| Order | Information | Notes |
|---|---|---|
| 7 | DS Parameter Set | The DS Parameter Set element is present within Beacon frames generated by STAs using Clause 15 (DSSS PHY specification for the 2.4 GHz band designated for ISM applications), Clause 18 (High Rate direct sequence spread spectrum (HR/DSSS) PHY specification), and Clause 19 (Extended Rate PHY (ERP) specification) PHYs. This element is also present if one of the 2.4 GHz band designated for ISM applications) or Clause 18 (High Rate direct sequence spread spectrum (HR/DSSS) PHY specification) is being used to transmit the beacon.(11n) |
| 8 | CF Parameter Set | The CF Parameter Set element is present only within Beacon frames generated by APs supporting a PCF.<br>This element is not present if dot11HighThrougputOption-Implemented is true and the Dual CTS Protection field of the HT Operation element is 1. |
| 9 | IBSS Parameter Set | The IBSS Parameter Set element is present only within Beacon frames generated by STAs in an IBSS. |
| 10 | Traffic indication map (TIM) | The TIM element is present only within Beacon frames generated bu APs. |
| 11 | Country | The Country element is present if<br>dot11MultiDomainCapabilityActivated is true or<br>dot11SpectrumManagementRequired is true or<br>dot11RadioMesurementActivated is true. |
| 12 | FH Parameters | FH Parameters as specified in 7.3.2.10 (Hopping Pattern Parameters element) are optionally present if<br>dot11MultiDomainCapabilityActivated is true. |
| 13 | FH Pattern Table | FH Pattern Table information as specified in 7.3.2.11 (Hopping Pattern Table element) are optionally present if<br>dot11MultiDomainCapabilityActivated is true. |
| 14 | Power Constraint | The Power Constraint element is present if<br>dot11SpectrumManagementRequired is true and is optionally present if dot11RadioMesurementActivated is true. |
| 15 | Channel Switch Announcement | Channel Switch Announcement element is optionally if<br>dot11SpectrumManagementRequired is true. |
| 16 | Quiet | The Quiet element is optionally present if<br>dot11SpectrumManagementRequired is true or<br>dot11RadioMesurementActivated is true. |
| 17 | IBSS DFS | IBSS DFS element is present if<br>dot11SpectrumManagementRequired is true in an IBSS. |
| 18 | TPC Report | The TPC Report element is present if<br>dot11SpectrumManagementRequired is true or<br>dot11RadioMesurementActivated is true. |
| 19 | ERP | The ERP element is present within Beacon frames generated by STAs using extended rate PHYs (ERPs) defined in Clause 19 (Extended Rate PHY (ERP) specification) and is oprionally present in other cases. |
| 20 | Extended Supported Rates | The Extended Supported Rates element is present if there are more than eight supported reates, and it is optional otherwise. |
| 21 | RSN | The RSN element is present within Beacon frames generated by STAs that have dot11RSNAActivated set to true. |

Fig. 13c

| Order | Information | Notes |
|---|---|---|
| 22 | BSS Load | The BSS Load element is present if dot11QosOption-Implemented and dot11QBSSLoadImplemented are both ture. |
| 23 | EDCA Parameter Set | The EDCA Parameter Set element is present if dot11QosOptionImplemented is true and the Qos Capability element is not present. |
| 24 | Qos Capability | The Qos Capability element is present if dot11QosOption-Implemented is true and EDCA Parameter Set element is not present. |
| 25 | AP Channel Report | If dot11RMAPChannelReportActivated is true, one AP Channel Report element is present for each operating class that has at least 1 channel to report. |
| 26 | BSS Average Access Delay | The BSS Average Access Delay element is present if dot11RMBSSAverageAccessDelayActivated is true and the value of the AP Average Access Delay field is not equal to 255 (measurement not available); otherwise, the BSS Average Access Dleay element is optionally present if dot11RMBSSAverageAccessDelayActivated is true. |
| 27 | Antenna | The Antenna element is present if dot11RMAntennaInformationActivated is true and the value of the Antenna ID field is not equal to 0 (unknown antenna); otherwise, the Antenna element is optionally present if dot11RMAntennaInformationActivated is true. |
| 28 | BSS Available Admission Capacity | The BSS Available Admission Capacity element is present if dot11RMBSSAvailableAdmissionCapacityActivated is true with the following exceptions: 1) when Available Admission Capacity Bitmask equals 0 (Available Admission Capacity List contains no entries), or 2) when the BSS Load element is present and the Available Capacity Bitmask equals 256 (Available Admission Capacity List contains only the AC_VO entry). |
| 29 | BSS AC Access Delay | The BSS AC Access Delay element is present if dot11RMBSSAverageAccessDelayActivated is true and at least one field of the element is not equal to 255 (measurement not available); otherwise, the BSS AC Access Delay element is optionally present if dot11RMBSSAverageAccessDelayActivated is true. |
| 30 | Measurement pilot Transmission | The Measurement pilot Transmission element is present if dot11RMMeasurementPilotActivated is a value between 2 and 7. |
| 31 | Multiple BSSID | The Multiple BSSID element is present if dot11RMMeasurementPilotActivated is a value between 2 and 7. and the AP is a member of a Multiple BSSID Set (see 11.10.11 (Multiple BSSID Set)) with two or more members. |
| 32 | RM Enables Capabilities | RM Enables Capabilities element is present if dot11RadioMeasurementActivated is true. |
| 33 | Mobility domain | The Mobility domain element (MDE) is present if dot11FastBSSTransitionActivated is true. |
| 34 | DSE registered location | The DSE registerd location element is present if dot11LCIDSERequired is true. |
| 35 | Extended Channel Switch Announcement | The Extended Channel Switch Announcement element is optionally present if dot11ExtendedChannelSwitchActivated is true. |

Fig. 13d

| Order | Information | Notes |
|---|---|---|
| 36 | Supported Operating Classes | The Supported Operating Classes element is present if dot11ExtendedChannelSwitchActivated is true. |
| 37 | HT Capabilities | The HT Capabilities element is present when dot11HighThroughputOptionImplemented attribute is true. |
| 38 | HT Operation | The HT Operation element is included by an AP when dot11HighThroughputOptionImplemented attribute is true. |
| 39 | 20/40 BSS Coexitence | The 20/40 BSS Coexitence element is optionally present when the dot112040BSSCoexistenceManagementSupport attribute is true. |
| 40 | Overlapping BSS Scan Parameters | The Overlapping BSS Scan Parameters element is optionally present if the dot11FirtyMHzOptionImplemented attribute is true. |
| 41 | Extended Capabilities | The Extended Capabilities element is optionally present if any of the fields in this element are nonzero. |
| Last | Vendor Specific | One or more vendor-specific element are optionally present. These elements follow all other elements. |

Fig. 14a

Probe Request frame body

| Order | Information | Notes |
|---|---|---|
| 1 | SSID | |
| 2 | Supported rates | |
| 3 | Capability | The Request element is optionally present if dot11MultiDomainCapabilityActivated is true. |
| 4 | Extended Supported Rates | The Extended Supported Rates element is present if there are more than eight supported rates, and is optionally present otherwise. |
| 5 | DS Parameter Set | The DS Parameter Set element is present within Probe Request frames generated by STAs using Clause 15 (DSSS PHY specification for the 2.4 GHz band designated for ISM applications), Clause 18 (High Rate direct sequence spread spectrum (HR/DSSS) PHY specification), or Clause 19 (Extended Rate PHY (ERP) specificatiion) PHYs if dot11RadioMeasurementActivated is true.<br><br>The DS Parameter Set element is optionally present within Probe Request frames generated by STAs using Clause 15 ((DSSS PHY specification for the 2.4 GHz band designated for ISM applications), Clause 18 (High Rate direct sequence spread spectrum (HR/DSSS) PHY specification), or Clause 19 (Extended Rate PHY (ERP) specificatiion) PHYs if dot11RadioMeasurementActivated is false. |

Fig. 14b

| Order | Information | Notes |
|---|---|---|
| 6 | Supported Operating Classes | The Supported Operating Classes element is present if dot11ExtendedChannelSwitchActivated is true. |
| 7 | HT Capabilities | The HT Capabilities element is present when dot11HighThroughputOptionImplemented attribute is true. |
| 8 | 20/40 BSS Coexitence | The 20/40 BSS Coexitence element is optionally present when the dot112040BSSCoexistenceManagementSupport attribute is true. |
| 9 | Extended Capabilities | The Extended Capabilities element is optionally present if any of the fields in this element are nonzero. |
| Last | Vendor Specific | One or more vendor-specific element are optionally present. These elements follow all other elements. |

Fig. 15a

Probe Response frame body

| Order | Information | Notes |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set element is present within Probe Response frames generated by STAs using FH PHYs. |
| 7 | DS Parameter Set | The DS Parameter Set element is present within Probe Request frames generated by STAs using Clause 15 (DSSS PHY specification for the 2.4 GHz band designated for ISM applications), Clause 18 (High Rate direct sequence spread spectrum (HR/DSSS) PHY specification), and Clause 19 (Extended Rate PHY (ERP) specificatiion) PHYs. |
| 8 | CF Parameter Set | The CF Parameter Set element is present only within Probe Response frames generated by APs supporting a PCF. |
| 9 | IBSS Parameter Set | The IBSS Parameter Set element is present only within Probe Response frames generated by SAPs in an IBSS. |
| 10 | Country | The Country element is present if present if dot11MultiDomainCapabilityActivated is true or dot11SpectrumManagementRequired is true or dot11RadioMesurementActivated is true. |
| 11 | FH Parameters | The FH Parameters element, as specified in 7.3.2.10 (Hopping Pattern Parameters element), is optionally present if dot11MultiDomainCapabilityActivated is true. |

Fig. 15b

| Order | Information | Notes |
|---|---|---|
| 12 | FH Pattern Table | The FH Pattern Table element, as specified in 7.3.2.11 (Hopping Pattern Table element), is optionally present if dot11MultiDomainCapabilityActivated is true. |
| 13 | Power Constraint | The Power Constraint element is present if dot11SpectrumManagementRequired is true and is optionally present if dot11RadioMesurementActivated is true. |
| 14 | Channel Switch Announcement | The Channel Switch Announcement element is optionally present if dot11SpectrumManagementRequired is true. |
| 15 | Quiet | The Quiet element is optionally present if dot11SpectrumManagementRequired is true or if dot11RadioMesurementActivated is true. |
| 16 | IBSS DFS | IBSS DFS element is present if dot11SpectrumManagementRequired is true in an IBSS. |
| 17 | TPC Report | The TPC Report element is present if dot11SpectrumManagementRequired is true or dot11RadioMesurementActivated is true. |
| 18 | ERP | The ERP element is present within Probe Response frames generated by STAs using ERPs and is optionally present otherwise. |
| 19 | Extended Supported Rates | The Extended Supported Rates element is present if there are more than eight supported reates, and it is optionally present otherwise. |
| 20 | RSN | The RSN element is present within Probe Response frames generated by STAs that have dot11RSNAActivated set to true. |
| 21 | BSS Load | The BSS Load element is present if dot11QosOptionImplemented and dot11QBSSLoadImplemented are both ture. |
| 22 | EDCA Parameter Set | The EDCA Parameter Set element is present if dot11QosOptionImplemented is true. |
| 23 | Measurement pilot Transmission | The Measurement pilot Transmission element is present if dot11RMMeasurementPilotActivated is between 2 and 7. |
| 24 | Multiple BSSID | The Multiple BSSID element is present if dot11RMMeasurementPilotActivated is a between 2 and 7 and the AP is a member of a Multiple BSSID Set (see 11.10.11 (Multiple BSSID Set)) with two or more members. |
| 25 | RM Enables Capabilities | RM Enables Capabilities element is present if dot11RadioMeasurementActivated is true. |
| 26 | AP Channel Report | If dot11RMAPChannelReportActivated is true, one AP Channel Report element is optionally present for each operating class that has at least 1 channel to report. |
| 27 | BSS Average Access Delay | The BSS Average Access Delay element is optionally present if dot11RMBSSAverageAccessDelayActivated is true and the value of the AP Average Access Delay field is not equal to 255 (measurement not available). |
| 28 | Antenna | The Antenna element is optionally present if dot11RMAntennaInformationActivated is true and the value of the Antenna ID field is not equal to 0 (unknown antenna). |

Fig. 15c

| Order | Information | Notes |
|---|---|---|
| 29 | BSS Available Admission Capacity | The BSS Available Admission Capacity element is optionally present if dot11RMBSSAvailableAdmissionCapacityActivated is true with the following exceptions: 1) when Available Admission Capacity Bitmask equals 0 (Available Admission Capacity List contains no entries), or 2) when the BSS Load element is present and the Available Capacity Bitmask equals 256 (Available Admission Capacity List contains only the AC_VO entry). |
| 30 | BSS AC Access Delay | The BSS AC Access Delay element is optionally present if dot11RMBSSAverageAccessDelayActivated is true and at least one field of the element is not equal to 255 (measurement not available). |
| 31 | Mobility domain | The MDE is present if dot11FastBSSTransitionActivated is true. dot11FastBSSTransitionActivated is true. |
| 32 | DSE registered location | The DSE registerd Location element is present if dot11LCIDSERequired is true. |
| 33 | Extended Channel Switch Announcement | The Extended Channel Switch Announcement element is optionally present if dot11ExtendedChannelSwitchActivated is true. |
| 34 | Supported Operating Classes | The Supported Operating Classes element is present if dot11ExtendedChannelSwitchActivated is true. |
| 35 | HT Capabilities | The HT Capabilities element is present when dot11HighThroughputOptionImplemented attribute is true. |
| 36 | HT Operation | The HT Operation element is included by an AP when dot11HighThroughputOptionImplemented attribute is true. |
| 37 | 20/40 BSS Coexitence | The 20/40 BSS Coexitence element is optionally present when the dot112040BSSCoexistenceManagementSupport attribute is true. |
| 38 | Overlapping BSS Scan Parameters | The Overlapping BSS Scan Parameters element is optionally present if the dot11FirtyMHzOptionImplemented attribute is true. |
| 39 | Extended Capabilities | The Extended Capabilities element is optionally present if any of the fields in this element are nonzero. |
| Last-1 | Vendor Specific | One or more vendor-specific element are optionally present. These elements follow all other elements, except the Requested elements. |
| Last-n | Requested elements | Elements requested by the Request element of the Probe Request frame are present if dot11MultiDomainCapabilityActivated is true. See 11.1.3.2.1 (Sending a probe response). |

US 9,078,186 B2

METHOD OF TRANSMITTING AND RECEIVING DATA IN A MULTI RADIO ACCESS TECHNOLOGY SYSTEM USING AN ACCESS POINT AND APPARATUS THEREFOR

CROSS-REFERENCE TO RELATED APPLICATIONS

This application is the National Stage filing under 35 U.S.C. 371 of International Application No. PCT/KR2011/007842, filed on Oct. 20, 2011, which claims the benefit of earlier filing date and right of priority to Korean Patent Application No. 10-2011-0107314, filed on Oct. 20, 2011, and also claims the benefit of U.S. Provisional Application Ser. No. 61/394,779, filed on Oct. 20, 2010, and U.S. Provisional Application Ser. No. 61/418,410, filed on Dec. 1, 2010, the contents of which are all hereby incorporated by reference herein in their entirety.

TECHNICAL FIELD

The present invention relates to a wireless communication, and more particularly, to a method for a base station and a user equipment to transmit and receive data in a multi radio access technology system based on an access point (AP) and apparatus therefor.

BACKGROUND ART

Recently, data traffic on a wireless communication network is increasing fast. This fast increasing data traffic is attributed to the advent and propagation of such a device requiring machine-to-machine (M2M) communication and high data traffic as a smart phone, a tablet PC and the like. In order to meet the required high data traffic, carrier aggregation (hereinafter abbreviated CA) by using more frequency bands efficiently, cognitive radio technology, MIMO technology for increasing data size within a limited frequency, multiple base station cooperative transmission technology and the like are getting the spotlight.

As ubiquitous environment has come, there is ongoing demand for receiving a seamless service irrespective of time and place using equipments.

Therefore, a wireless communication network establishes a cooperative system among a plurality of user equipments communicating with each other via a base station and has been making progress to enable at least one or more user equipments to transmit/receive data to/from a base station in accordance with the communication environment.

In this case, a plurality of the user equipments may include a source device as a subject to communicate with a base station with helps of other user equipments connected to the source device, a cooperative device playing a role as a relay to help a source device to communicate with a base station and a cooperative device candidate except a source device playing a role as a cooperative device.

A wireless communication system provided with user equipments in high density may be able to give higher system performance by the cooperation among the user equipments. For instance, in case of attempting to transmit prescribed data to a base station, a source device may transmit the data together with a cooperative device. Moreover, the source device may be able to transmit the data via the cooperative device. The above-described example may be identically applicable to a case that a base station transmits data to a user equipment, by which further excellent system performance may be accomplished. In the following description, a wireless communication system including a plurality of user equipments having established a cooperative system may be named a multi radio access technology (RAT) system.

However, since a source device has mobility, it may be necessary to periodically or aperiodically update information on a plurality of cooperative device candidates existing positions close to the source device. And, the demand for a corresponding solution is rising.

DISCLOSURE OF INVENTION

Technical Problem

Accordingly, the present invention is directed to a wireless communication, and more particularly, to a method for a base station and a user equipment to transmit and receive data in a multi radio access technology system using an access point and apparatus therefore, which may substantially obviate one or more of the problems due to limitations and disadvantages of the related art.

An object of the present invention is to provide a method for a user equipment supporting a multi-RAT (multi-radio access technology) using an access point to perform a communication.

Another object of the present invention is to provide a method for a cooperative user equipment supporting a multi-RAT (multi-radio access technology) using an access point to perform a communication.

Another object of the present invention is to provide a method for a base station supporting a multi-RAT (multi-radio access technology) using an access point to perform a communication.

Another object of the present invention is to provide a user equipment supporting a multi-RAT (multi-radio access technology) using an access point.

Another object of the present invention is to provide a cooperative user equipment candidate supporting a multi-RAT (multi-radio access technology) using an access point.

A further object of the present invention is to provide a base station supporting a multi-RAT (multi-radio access technology) using an access point.

Technical tasks obtainable from the present invention are non-limited the above mentioned effect. And, other unmentioned technical tasks s can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of performing a communication, which is performed by a user equipment based on an access point (AP) supporting a multi-RAT (multi-radio access technology), according to one embodiment of the present invention may include the steps of receiving an information on a $1^{st}$ AP associated with the user equipment among a plurality of APs from the $1^{st}$ AP, transmitting the information on the $1^{st}$ AP to a base station, receiving an information on at least one cooperative user equipment candidate associated with the 1st AP from the base station, and transmitting a 1st data to the base station using the at least one cooperative user equipment, wherein the 1st data is exchanged between the user equipment and the at least one cooperative user equipment via a 1st radio access scheme and wherein the 1st data is exchanged between the at least one cooperative user equipment and the base station via a 2nd radio access scheme.

Preferably, the method may further include the step of directly transmitting a 2nd data to the base station from the user equipment via the 2nd radio access scheme.

Preferably, the 1st radio access scheme may include WiFi (wireless fidelity) access scheme and the 2nd radio access scheme may include WiMAX (worldwide interoperability for microwave access) scheme.

Preferably, the information on the 1st AP may include at least one selected from the group consisting of a MAC (medium access control) address information and an SSID (service set identifier) information.

Preferably, the information on the 1st AP may be periodically received from the 1st AP.

Preferably, the method may further include the step of transmitting a probe request message to the 1st AP from the user equipment and the information on the 1st AP may be received via a probe response message in response to the transmitted probe request message.

Preferably, the method may further include the step of periodically monitoring whether the information on the at least one cooperative user equipment candidate is received.

To further achieve these and other advantages and in accordance with the purpose of the present invention, a method of performing a communication, which is performed by a cooperative user equipment candidate based on an access point (AP) supporting a multi-RAT (multi-radio access technology), according to another embodiment of the present invention may include the steps of receiving an information on a 1st AP associated with the cooperative user equipment candidate among a plurality of APs from the 1st AP, transmitting the information on the 1st AP to a base station, receiving a 1st data from a user equipment associated with the 1st AP, and transmitting the received 1st data to the base station, wherein the 1st data is exchanged between the user equipment and the cooperative user equipment candidate via a 1st radio access scheme and wherein the 1st data is exchanged between the cooperative user equipment candidate and the base station via a 2nd radio access scheme.

Preferably, the 1st radio access scheme may include WiFi (wireless fidelity) access scheme and the 2nd radio access scheme may include WiMAX (worldwide interoperability for microwave access) scheme.

Preferably, the method may further include the step of receiving an activation request message for a client cooperation from the base station and the information on the 1st AP may be transmitted to the base station in response to the activation request message.

Preferably, the information on the 1st AP may include at least one selected from the group consisting of a MAC (medium access control) address information and an SSID (service set identifier) information.

Preferably, the information on the 1st AP may be periodically received from the 1st AP.

Preferably, the method may further include the step of transmitting a probe request message to the 1st AP from the user equipment and the information on the 1st AP may be received via a probe response message in response to the transmitted probe request message.

To further achieve these and other advantages and in accordance with the purpose of the present invention, a method of performing a communication, which is performed by a base station based on an access point (AP) supporting a multi-RAT (multi-radio access technology), according to another embodiment of the present invention may include the steps of receiving an information on an AP associated with each of a plurality of cooperative user equipment candidates among a plurality of APs from the a plurality of the cooperative user equipment candidates, receiving an information on a 1st AP among a plurality of the APs from a user equipment, and transmitting an information on at least one cooperative user equipment candidate associated with the 1st AP among APs respectively associated with a plurality of the cooperative user equipment candidates to the user equipment, wherein the base station exchanges a 1st data with the user equipment using the at least one cooperative user equipment candidate, wherein the 1st data is exchanged between the user equipment and the at least one cooperative user equipment via a 1st radio access scheme, and wherein the 1st data is exchanged between the at least one cooperative user equipment and the base station via a 2nd radio access scheme.

Preferably, the method may further include the step of directly receiving a 2nd data from the user equipment via the 2nd radio access scheme.

Preferably, the 1st radio access scheme may include WiFi (wireless fidelity) access scheme and the 2nd radio access scheme may include WiMAX (worldwide interoperability for microwave access) scheme.

Preferably, the at least one cooperative user equipment candidate may be determined by the base station using at least one selected from the group consisting of information on whether a client cooperation operation is supportable, moving speed information, location information, retained power information, channel status information and information on a presence or non-presence of neighbor cooperative user equipment candidate(s) in the vicinity and the number of neighbor cooperative user equipment candidate(s).

To further achieve these and other advantages and in accordance with the purpose of the present invention, a user equipment, which is based on an access point (AP) supporting a multi-RAT (multi-radio access technology), according to another embodiment of the present invention may include a receiving module receiving an information on a 1st AP associated with the user equipment among a plurality of APs from the 1st AP, the receiving module receiving an information on at least one cooperative user equipment candidate associated with the 1st AP from a base station, a transmitting module transmitting the information on the 1st AP to the base station, the transmitting module transmitting a 1st data to the base station using the at least one cooperative user equipment, and a processor controlling the 1st data to be exchanged between the user equipment and the at least one cooperative user equipment via a 1st radio access scheme, the processor controlling the 1st data to be exchanged between the at least one cooperative user equipment and the base station via a 2nd radio access scheme.

To further achieve these and other advantages and in accordance with the purpose of the present invention, a cooperative user equipment candidate, which is based on an access point (AP) supporting a multi-RAT (multi-radio access technology), according to another embodiment of the present invention may include a receiving module receiving an information on a 1st AP associated with the cooperative user equipment candidate among a plurality of APs from the 1st AP, the receiving module receiving a 1st data from a user equipment associated with the 1st AP, a transmitting module transmitting the information on the 1st AP to a base station, the transmitting module transmitting the received 1st data to the base station, and a processor controlling the 1st data to be exchanged between the user equipment and the cooperative user equipment candidate via a 1st radio access scheme, the processor controlling the 1st data to be exchanged between the cooperative user equipment candidate and the base station via a 2nd radio access scheme.

To further achieve these and other advantages and in accordance with the purpose of the present invention, a base station, which is based on an access point (AP) supporting a multi-RAT (multi-radio access technology), according to a further embodiment of the present invention may include a receiving module receiving an information on an AP associated with each of a plurality of cooperative user equipment candidates among a plurality of APs from the a plurality of the cooperative user equipment candidates, the receiving module receiving an information on a 1st AP among a plurality of the APs from a user equipment, a transmitting module transmitting an information on at least one cooperative user equipment candidate associated with the 1st AP among APs respectively associated with a plurality of the cooperative user equipment candidates to the user equipment, and a processor controlling the base station to exchange a 1st data with the user equipment using the at least one cooperative user equipment candidate, the processor controlling the 1st data to be exchanged between the user equipment and the at least one cooperative user equipment via a 1st radio access scheme, the processor controlling the 1st data to be exchanged between the at least one cooperative user equipment and the base station via a 2nd radio access scheme.

It is to be understood that both the foregoing general description and the following detailed description are exemplary and explanatory and are intended to provide further explanation of the invention as claimed.

Advantageous Effects of Invention

Accordingly, the present invention provides the following effects and/or advantages.

First of all, a base station in a multi-RAT (multi-radio access technology) may be able to effectively transmit data to a source device according to the contents of the present invention.

Secondly, a source device in a multi-RAT (multi-radio access technology) may be able to effectively transmit data to a base station via a cooperative device according to the contents of the present invention.

Effects obtainable from the present invention are non-limited the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the Drawings:

FIG. 3 is a diagram for a detailed example of a basic service set in accordance with a presence or non-presence of a use of an access point (AP);

FIG. 13A to 13D are diagrams for one example of a notification signal transmission frame of a passive scan type according to the present invention;

FIG. 14A and FIG. 14B are diagrams for one example of a notification signal request transmission frame of an active scan type according to the present invention;

FIGS. 15A to 15C are diagrams for one example of a notification signal response transmission frame of an active scan type according to the present invention.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the following description of the present invention may be usable for various wireless access schemes including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution) and the like. OFDMA can be implemented with such a radio technology as IEEE (Institute of Electrical and Electronics Engineers) 802.11 (Wi-Fi), IEEE 802.16 (WiMAX), IEEE 802.20, E-UTRA (Evolved UTRA) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of LTE. Moreover, IEEE 802.16m is an evolved version of IEEE 802.16e.

In this specification, a terminology called radio access (multi-RAT) may be variously named such a terminology as radio communication scheme and the like.

Figure 1:
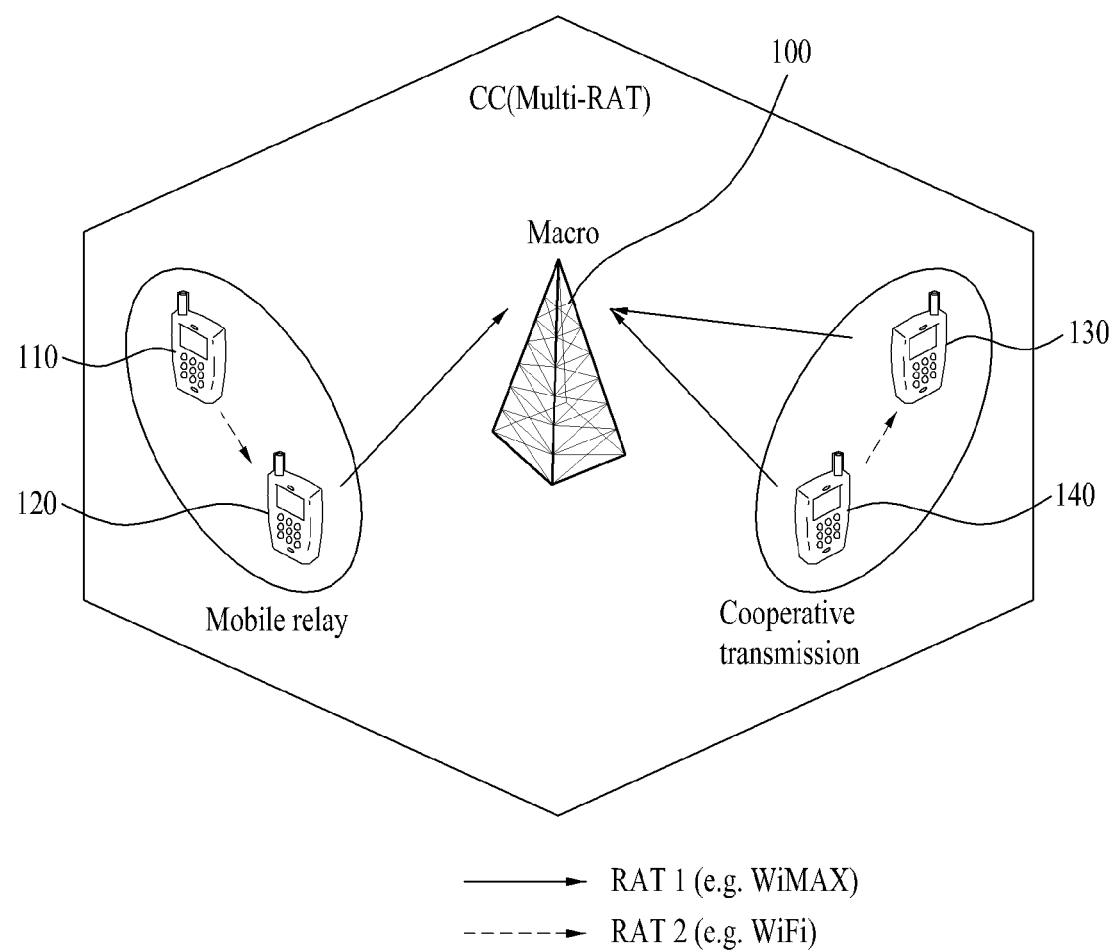
FIG. 1 is a diagram for one example of a multi-RAT (multi-radio access technology) system.

FIG. 1 is a diagram for one example of a multi-RAT (multi-radio access technology) system.

Referring to FIG. 1, a multi-radio access technology (hereinafter abbreviated a multi-RAT) system may include a base station 100 and a plurality of communication devices 110, 120, 130 and 140.

The devices 1120, 120, 130 and 140 represented as communication devices in FIG. 1 may become a source device as a subject to communicate with a base station with helps of other user equipments connected to the source device, a cooperative device playing a role as a relay to help a source device to communicate with a base station and a cooperative device candidate except a source device playing a role as a cooperative device and the like.

In a multi-RAT system, a plurality of the communication devices 110, 120, 130 and 140 may establish a cooperative system with each other. In the cooperative system established multi-RAT system, a source device may be able to transmit data to a base station together with a cooperative device. Moreover, a source device may be able to receive data from a base station together with a cooperative device.

In this case, a direct radio communication scheme among a plurality of devices may differ from a direct radio communication scheme between a base station and a plurality of devices. In particular, data may be transceived by applying a wireless LAN access scheme (e.g., Wi-Fi, etc.) among a plurality of devices, while data may be transceived by applying a mobile communication network access scheme (e.g., IEEE 802.16 (WiMAX), etc.) between a base station and a plurality of devices.

For instance, a plurality of devices may perform a direct communication in-between by IEEE 802.11 (Wi-Fi) scheme or Bluetooth scheme. On the other hand, each of a plurality of devices may perform a direct communication with a base station by IEEE 802.16 (WiMAX) scheme.

Yet, the present invention may be non-limited by the above description and may enable a plurality of devices to communicate with each other by the same wireless or radio communication scheme.

Referring to FIG. 1, in the cooperative system established multi-RAT system, the source device 140 may be able to transmit data to the base station 100 together with the cooperative device 130. Through this, since a communication device may be able to efficiently transmit data, it may be able to secure good performance. Moreover, through the cooperative system established multi-RAT system, each device may be able to reinforce its throughput and power consumption may be reduced using a data communication via a cooperative system.

In the cooperative system established multi-RAT system, a source device may be able to transmit data to a base station via a cooperative device. And, a source device may be able to receive data from a base station via a cooperative device.

Referring to FIG. 1, in the cooperative system established multi-RAT system, the source device 100 may be able to transmit data to the base station 100 via the cooperative device 120. Through this, since a communication device may be able to efficiently transmit data, it may be able to prevent degradation of system performance.

Although FIG. 1 shows the example for a source device to transmit data to t abase station via a cooperative device, the above description may be identically applicable to a case for a base station to receive data from a source device as well.

When a different data is transmitted, referring to FIG. 1, the source device 110/140 may become a cooperative device or a neighbor device failing to join a data transmission and the cooperative device 120/130 may becomes a source device or a neighbor device failing to join a data transmission.

Figure 2:
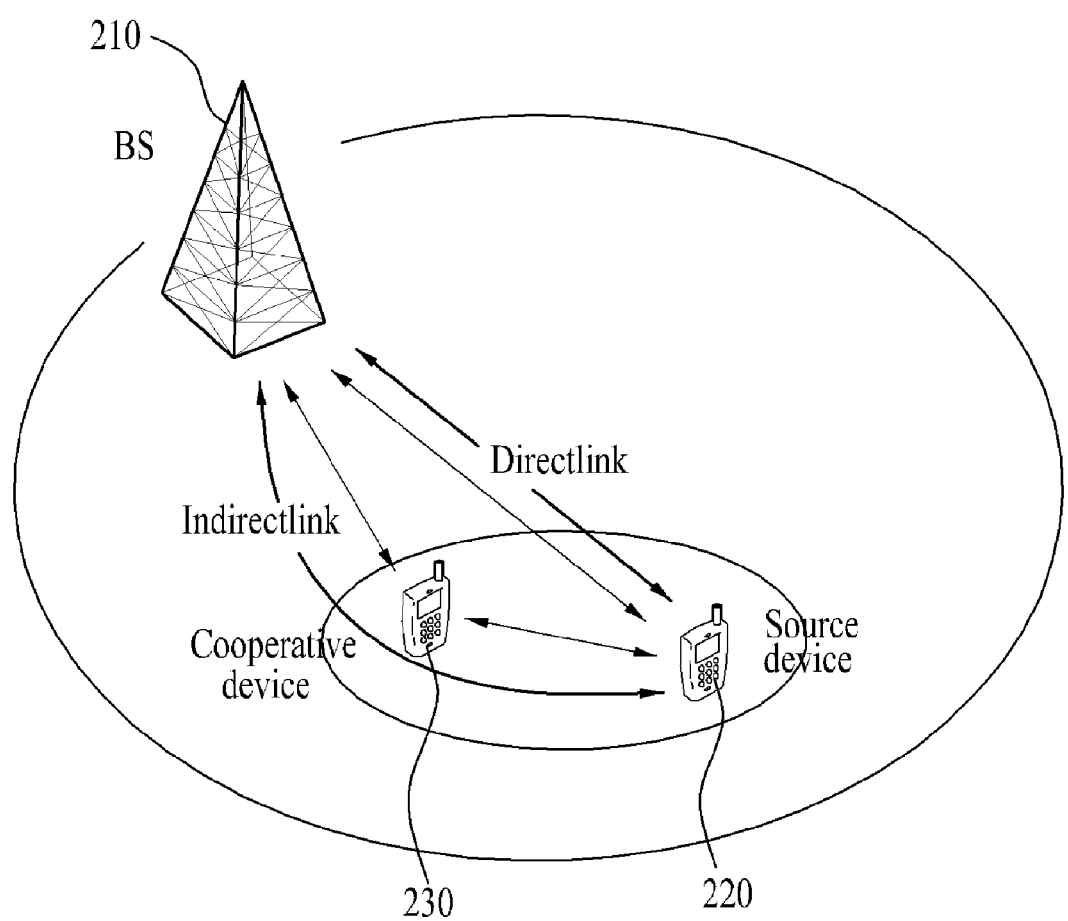
FIG. 2 is a diagram for one example of an operation of a multi-RAT (multi-radio access technology) system.

FIG. 2 is a diagram for one example of an operation of a multi-RAT (multi-radio access technology) system.

Referring to FIG. 2, a multi-RAT system may include a base station 210 and a plurality of communication devices 220 and 230.

In a multi-RAT system, a plurality of the communication devices 220 and 230 may be able to establish a cooperative system together by such a radio technology as 802.11 (Wi-Fi) and the like.

In general, each of a plurality of the communication devices 220 and 230 may be able to directly transmit/receive data to/from the base station 210 by such a radio technology as IEEE 802.16 (WiMAX) and the like.

In doing so, in case that a current communication quality of the source device 220 is abruptly lowered, it may be able to indirectly transmit data to the base station 210 via the cooperative device 230. Moreover, the source device 220 may be able to indirectly receive data from the base station 210 via the cooperative device 230.

Thus, in a multi-RAT system, a communication device may be able to directly exchange data with a base station and may be also able to indirectly exchange data with the base station with a help of a cooperative device having a good communication quality. Therefore, degradation of system performance can be prevented and efficient data communication can be performed.

In order to transmit and receive data with the cooperation of a plurality of communication devices in a multi-RAT system, a prior procedure for exchanging information in advance may be required.

The information exchanging procedure, which should be performed between a base station and a plurality of communication devices in a multi-RAT system may mainly include 4 steps. In particular, the 4 steps may include a general network entering step, a negotiating step for a plurality of devices to cooperate with each other, a step of searching neighbor devices of a source device and selecting a cooperative device from the searched neighbor devices, and a step of connecting to the selected cooperative device.

Meanwhile, in a multi-RAT system, a method for a plurality of communication devices to cooperatively communicate with each other may be classified into an infrastructure basic service set (infrastructure BSS) and an independent basic service set (independent BSS) in accordance with a presence or non-presence of using an access point (hereinafter abbreviated AP).

The access point (AP) may mean a connecting point between a base station and a plurality of user equipments in a multi-RAT system and may be called a mutual access point as well. For instance, the access point (AP) may be an intermediate agent that connects a wire LAN and a wireless LAN together.

Although the access point may be represented as ACCESS POINT, AP and the like, it may be just called an access point for clarity and convenience of the following description.

In case that an access point (AP) is used by a multi-RAT system, it may be able to provide a point-to-point function of enabling user equipments respectively situated at two different points to communicate with each other by connecting the user equipments together.

Unlike the point-to-point function, it may be able to provide a point-to-multipoint function of enabling a plurality of user equipments to communicate with each other by simultaneously connecting a plurality of the user equipments together.

And, it may be able to provide a repeater function of extending a data communication into a radio area by connecting to a base station and another access point (AP) by wireless. In particular, an access point (AP) set as a repeater may be able to communicate with another access point (AP) by providing a connection with a base station.

Moreover, it may be able to provide a wireless client function of exchanging signals by wireless in a manner of being connected to a plurality of user equipments capable of exchanging signals by a wired or short-range communication network.

FIG. 3 is a diagram for a detailed example of a basic service set in accordance with a presence or non-presence of a use of an access point (AP).

FIG. 3 (a) shows one example of an infrastructure basic service set (BSS).

In the infrastructure basic service set (BSS), a plurality of user equipments performs communications using an access point (AP).

A multi-RAT system may include a plurality of access points (APs). And, a plurality of user equipments may exist around each of a plurality of the access points.

FIG. 3 (b) shows one example of an independent basic service set (BSS).

In the independent basic service set, a plurality of user equipment may be directly connected to each other.

The above-mentioned contents includes a case that a plurality of user equipments are located within a coverage of each of a plurality of access points, a case that a plurality of user equipments are connected to each other by wireless, and a case that a plurality of user equipments are detected within a coverage. In particular, when a user equipment and an access point are correlated to each other, it may be able to implement the infrastructure basic service set (BSS).

Yet, for clarity and convenience of the following description, assume that each user equipment is connected to a corresponding access point to configure an infrastructure basic service set (BSS).

In the following description, an operation for a client cooperation in an infrastructure basic service set (BSS) configuration may be explained in detail with reference to FIG. 4.

Figure 4:
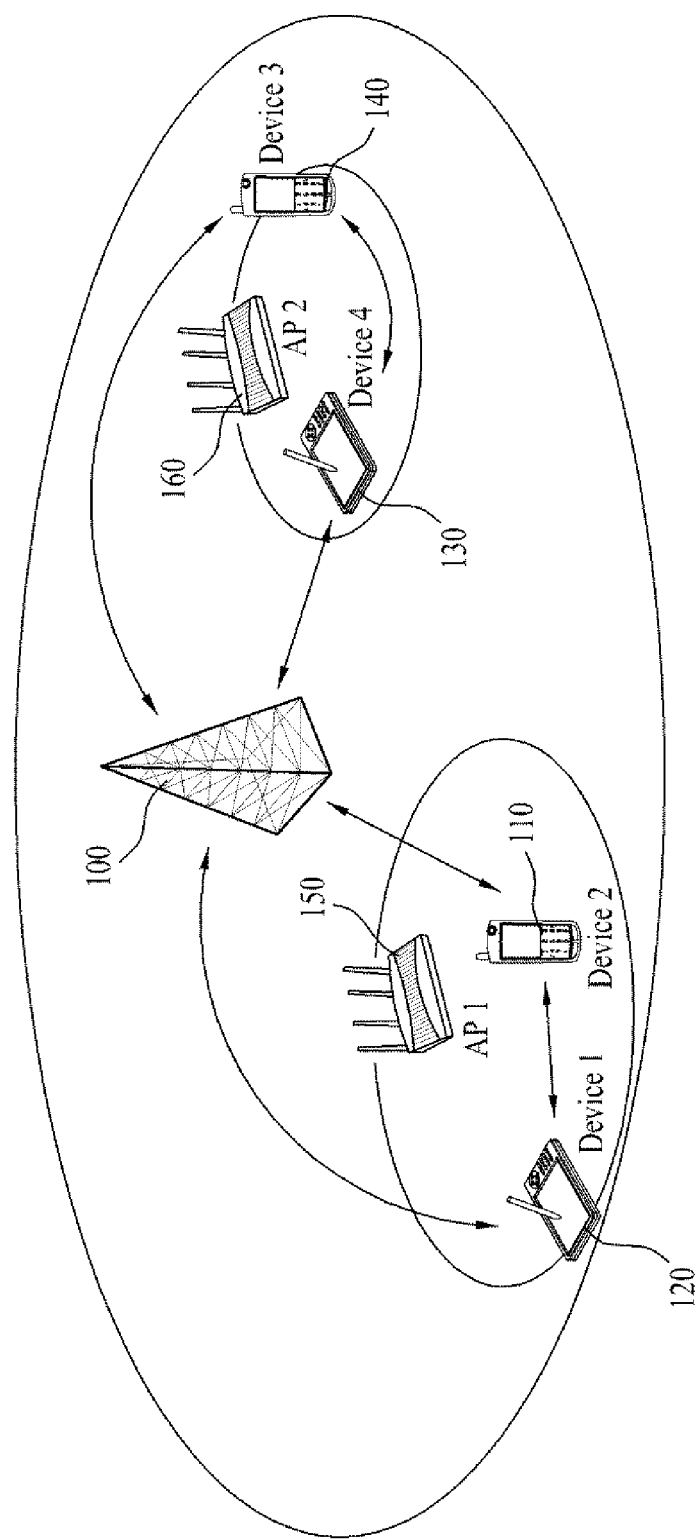
FIG. 4 is a diagram for one example of transceiving data between a base station and a user equipment in an AP-based (access point-based) multi-RAT system.

FIG. 4 is a diagram for one example of transceiving data between a base station and a user equipment in an AP-based (access point-based) multi-RAT system having the aforesaid access point (AP) applied thereto.

Referring to FIG. 4, a $1^{st}$ access point 150 and a $2^{nd}$ access point 160 may be included in a multi-RAT system.

A $1^{st}$ user equipment 110 and a $2^{nd}$ user equipment 120 exist in the vicinity of the $1^{st}$ access point 150. And, each of the $1^{st}$ user equipment 110 and the $2^{nd}$ user equipment 120 may be able to perform a data communication operation for a client cooperation with a base station 100.

A $3^{rd}$ user equipment 130 and a $4^{th}$ user equipment 140 exist in the vicinity of the $2^{nd}$ access point 160. And, each of the $3^{rd}$ user equipment 130 and the $4^{th}$ user equipment 140 may be able to perform a data communication operation for the client cooperation with the base station 100.

In the following description, a structure of a radio frame applicable to the present invention may be explained.

For clarity and convenience of the following description, a structure of a radio frame applicable in 3GPP LTE may be taken as an example, by which the present invention may be non-limited. And, various types of radio frame structures may be applicable to the present invention.

Figure 5:
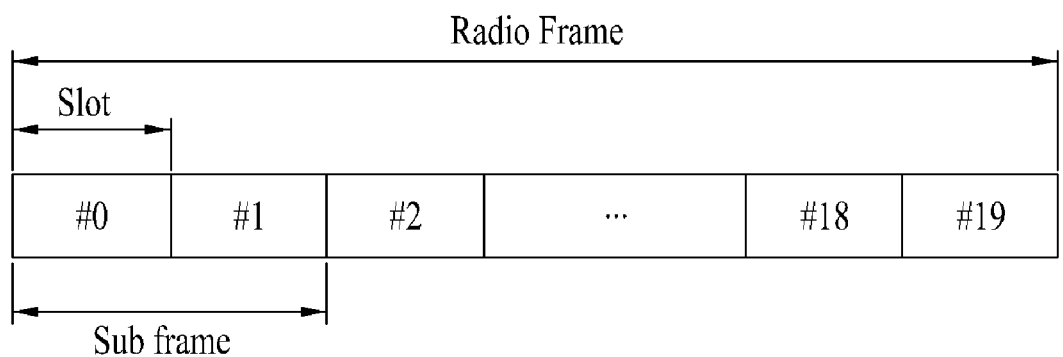
FIG. 5 is a diagram for a structure of FDD (frequency division duplex) radio frame in 3GPP LTE.

FIG. 5 is a diagram for a structure of FDD (frequency division duplex) radio frame in 3GPP LTE. This radio frame structure may be named a frame structure type 1.

Referring to FIG. 5, a radio frame may include 10 subframes and each of the subframes may be defined as 2 contiguous slots. A time taken for one subframe to be transmitted may be called a transmission time interval (TTI). A time length of a radio frame may be defined as $T_f=307200*T_s=10$ ms and may include 20 slots. A time length of the slot may be defined as $T_{slot}=15360*T_s=0.5$ ms and may be numbered as 0 to 19. A downlink, in which each node or base station transmits a signal to a user equipment, may be discriminated from an uplink, in which the user equipment transmits a signal to each node or base station, in frequency domain.

Figure 6:
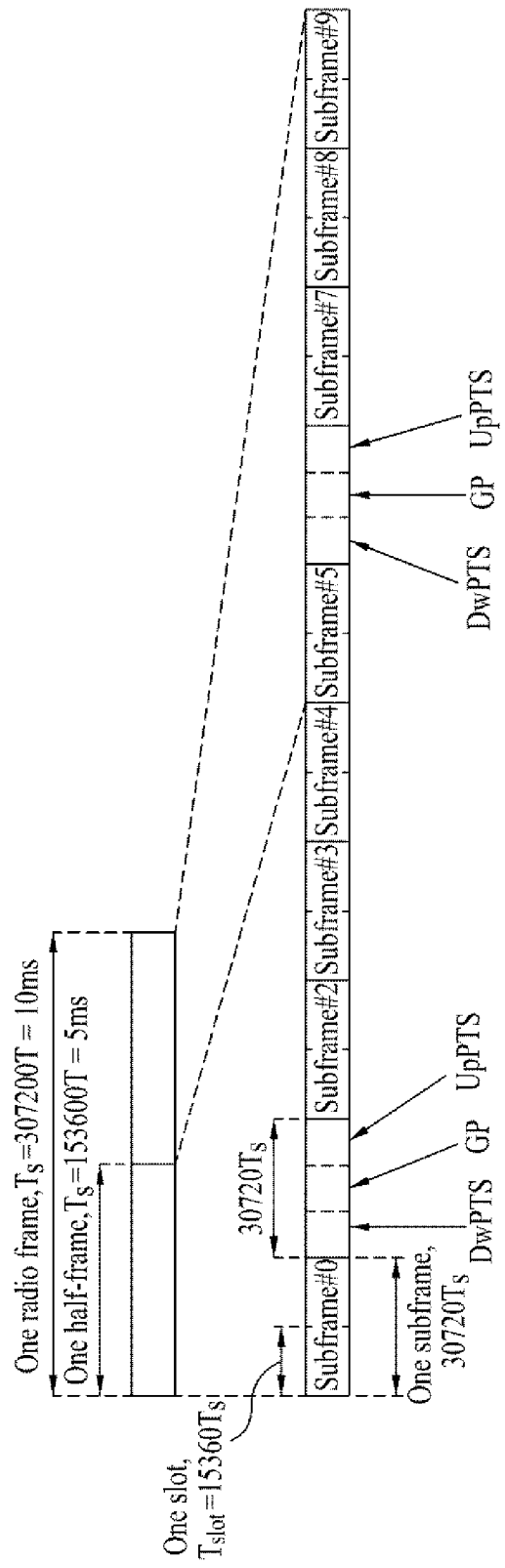
FIG. 6 is a diagram for a structure of TDD (time division duplex) radio frame in 3GPP LTE.

FIG. 6 is a diagram for a structure of TDD (time division duplex) radio frame in 3GPP LTE. This radio frame structure may be named a frame structure type 2.

Referring to FIG. 6, one radio frame may have a length of 10 ms and may include two half-frames each of which has a length of 5 ms. One subframe may be designated as one of a UL subframe, a DL subframe and a special subframe. One radio frame may include at least one UL subframe and at least one DL subframe. One subframe may be defined as 2 contiguous slots. For instance, a length of one subframe may be 1 ms and a length of one slot may be 0.5 ms.

A special subframe is a specific period for separating an uplink and a downlink from each other between a UL subframe and a DL subframe. At least one special subframe may exist in one radio frame. And, a special subframe may include a downlink pilot time slot (DwPTS), a guard period and an uplink pilot time slot (UpPTS). The DwPTS may be used for initial cell search, synchronization or channel estimation. The UpPTS may be used for channel estimation in a base station and a UL transmission synchronization matching of a user equipment. The guard period is an interval between an uplink and a downlink to eliminate an interference generated in UL due to a multi-path delay of a DL signal.

One slot in FDD/TDD radio frame may include a plurality of OFDM (orthogonal frequency division multiplexing) symbols in time domain and may include a plurality of resource blocks (RBs) in frequency domain. Since 3GPP LTE uses PFDMA in DL, the OFDM symbol may represent one symbol period and may be called such a different terminology as SC-FDMA symbol and the like in accordance with a multi-access scheme. The resource block may include a plurality of contiguous subcarriers in one slot by a resource allocation unit.

The radio frame structures described with reference to FIG. 5 and FIG. 6 may refer to Paragraph 4.1 and Paragraph 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

The above-mentioned radio frame structures may be just exemplary. And, the number of subframes included in a radio frame, the number of slots included in a subframe, the number of OFDM symbols included in a slot and the like may be modifiable in various ways.

Figure 7:
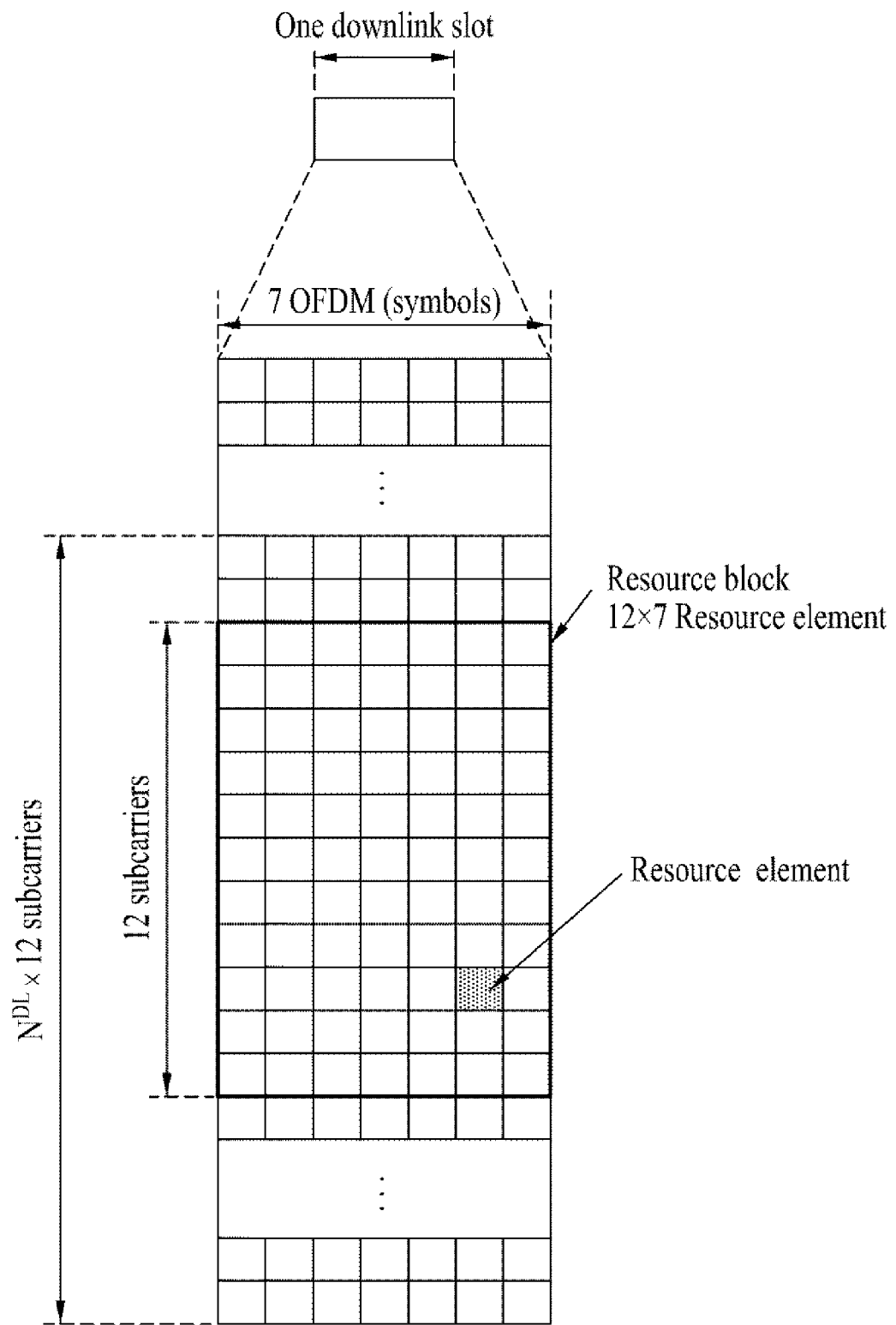
FIG. 7 is a diagram for one example of a resource grid for one downlink slot.

FIG. 7 is a diagram for one example of a resource grid for one downlink slot.

Referring to FIG. 7, one DL slot may include a plurality of OFDM symbols in time domain. In particular, one DL slot includes 7 OFDMA slots and one resource block (RB) includes 12 subcarriers in frequency domain, which is just exemplary and by which the present invention may be non-limited.

Each element on a resource grind may be called a resource element and one resource block (RB) includes 12 7 resource elements. The number NDL of resource blocks included in a DL slot may depend on a DL transmission bandwidth set for a cell. The above-mentioned resource grid for the DL slot may be applicable to a UL slot as well.

Figure 8:
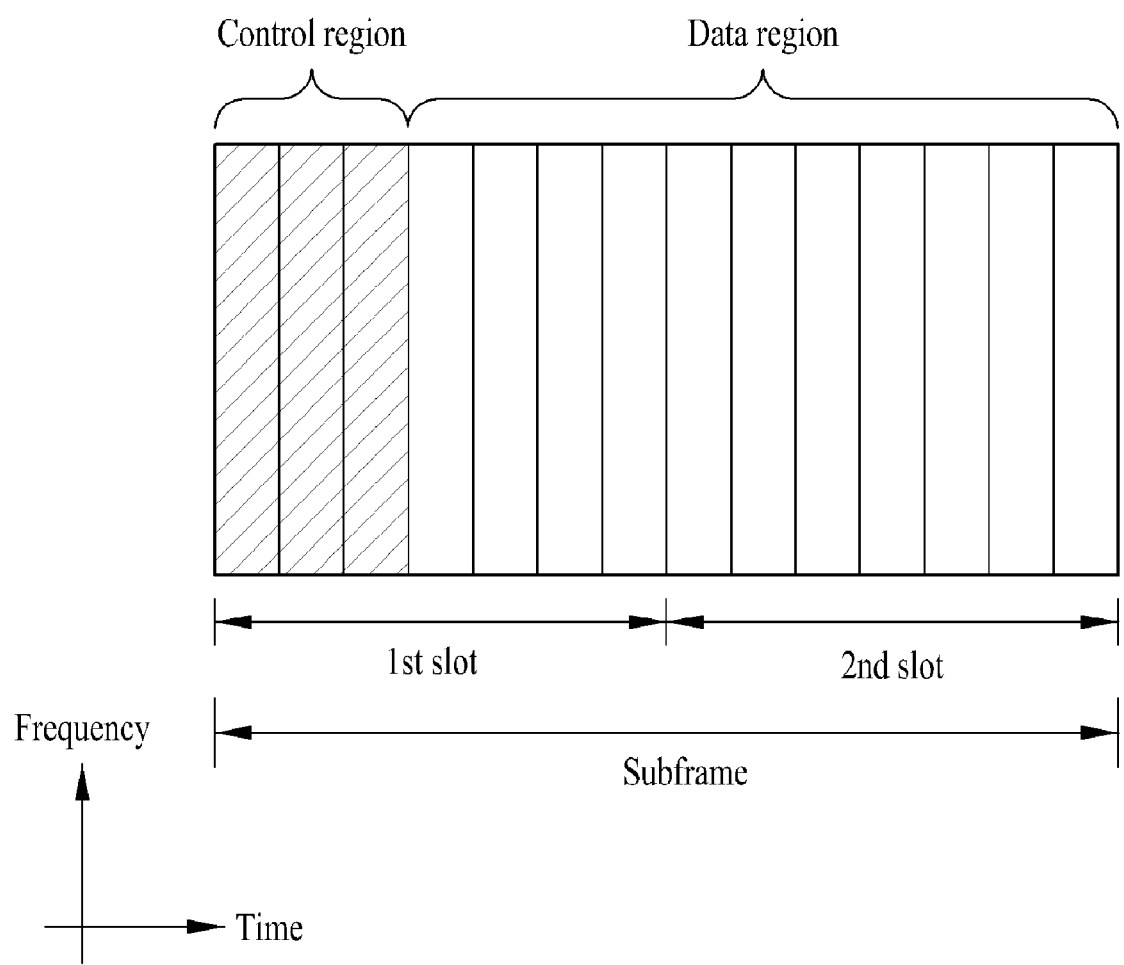
FIG. 8 is a diagram for one example of a structure of a downlink frame.

FIG. 8 is a diagram for one example of a structure of a downlink frame.

Referring to FIG. 8, a subframe may include 2 contiguous slots. Maximum 3 fore OFDM symbols of a $1^{st}$ slot within the subframe may correspond to a control region to which DL control channels are allocated. And, the rest of OFDM symbols may become a data region to which PDSCH (physical downlink shared channel) is allocated.

In the DL control channel, PCFICH (Physical Control Format Indicator Channel), PDCCH (Physical Downlink Control Channel), PHICH (Physical Hybrid-ARQ Indicator Channel) and the like may be included. The PCFICH carried on a $1^{st}$ OFDM symbol of a subframe may carry information on the number of OFDM symbols (i.e., a size of a control region) used for a transmission of control channels in the subframe. Control information carried on PDCCH may be called downlink control information (DCI). The DCI may indicate UL resource allocation information, DL resource allocation information, UL transmit power control command for random UE groups and the like. The PHICH may carry ACK/NACK (acknowledgement/negative-acknowledgement) signal for HARQ (hybrid automatic repeat request) of UL data. In particular, ACK/NACK signal for UL data transmitted by a user equipment may be carried on the PHICH.

The PDSCH is a channel that carries control information and/or data. A user equipment may be able to read data carried on the PDSCH by decoding DL control information carried on the PDCCH.

Figure 9:
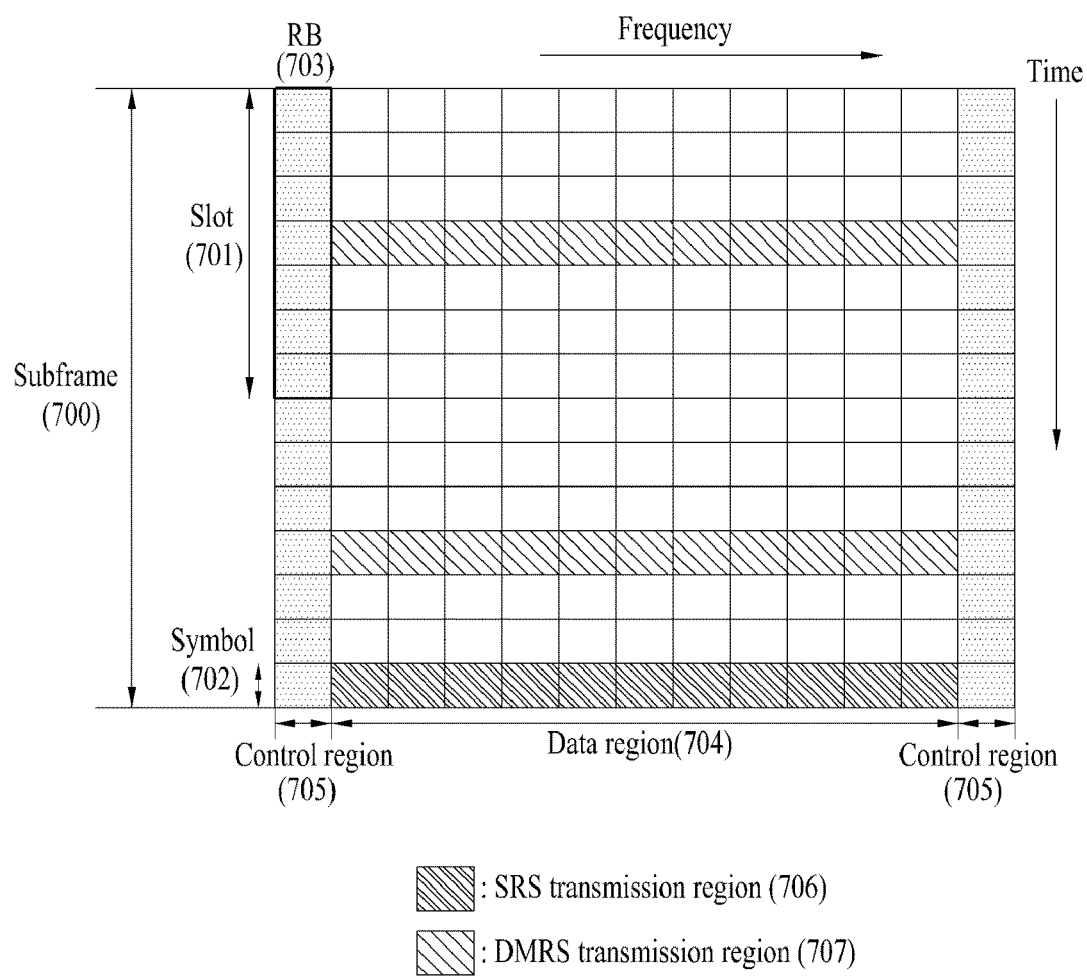
FIG. 9 is a diagram for a structure of an uplink subframe used in LTE system.

FIG. 9 is a diagram for a structure of an uplink subframe used in LTE system.

Referring to FIG. 9, a subframe 700 having a length of 1 ms, which is a basic unit of LTE UL transmission may include two 0.5 ms slots 701. Assuming a length of a normal cyclic prefix (CP), each slot includes 7 OFDM symbols 702 and one symbol corresponds to one SC-FDMA symbol. A resource block 703 is a resource allocation unit which corresponds to 12 subcarriers in frequency domain and one slot in time domain. A structure of UL subframe of LTE may be mainly divided into a data region 704 and a control region 705. In this case, the data region may mean a series of communication resources used in transmitting data of audio, packet and the like to each user equipment and may correspond to the rest of resources except the control region in the subframe. The control region may mean a series of communication resources used in transmitting a DL channel quality report from each user equipment, reception ACK/NACK for a DL signal and a UL scheduling request and the like.

According to the example shown in FIG. 9, a region 706 for transmitting a sounding reference signal in one subframe corresponds to an interval, in which an SC-FDMA symbol situated at a last position on a time axis in one subframe exists, and may be transmitted via a data transmission bandwidth on a frequency axis. Sounding reference signals of several user equipments, which are carried on last SC-FDMA in the same subframe, may be identifiable in a cyclic shift value. Moreover, a region for transmitting a DM-reference signal (demodulation-reference signal) in one subframe corresponds to an interval, in which a middle SC-FDMA symbol in one slot, i.e., $4^{th}$ SC-FDMA symbol and $11^{th}$ SC-FDMA symbol exist, and may be transmitted via a data transmission region on a frequency axis.

Figure 10:
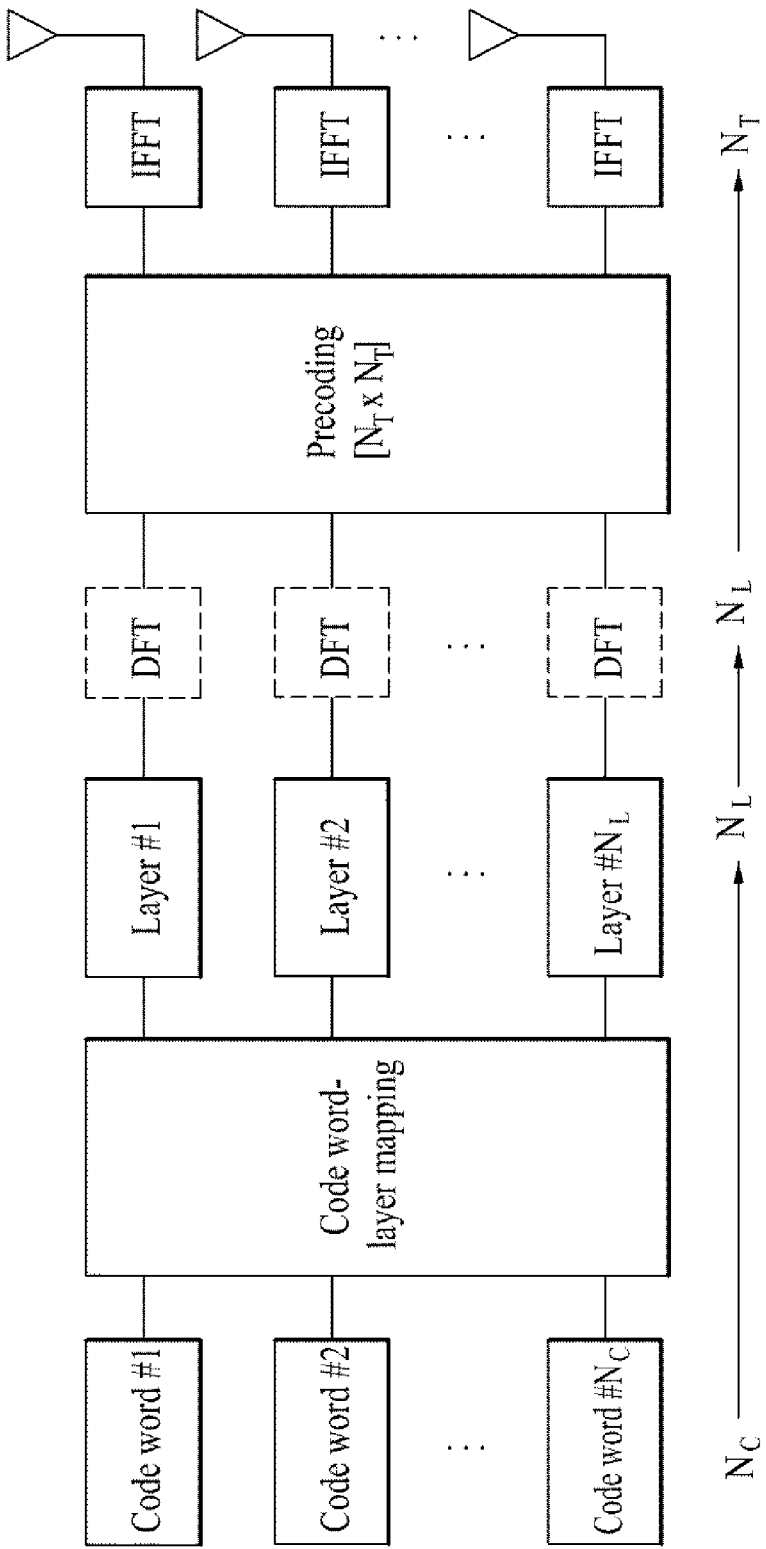
FIG. 10 is a diagram for explaining mapping relations among a code word, a layer and an antenna to transmit a downlink signal in a multi-RAT (multi-radio access technology) system.

FIG. 10 is a diagram for explaining mapping relations among a code word, a layer and an antenna to transmit a downlink signal in a multi-RAT (multi-radio access technology) system.

Referring to FIG. 10, a complicated mapping relation may exist between data information and transmission symbol. First of all, a MAC (medium access control) layer may deliver $N_C$ transport blocks as data information to a physical layer. In the physical layer, the transport blocks may be transformed into a code word by channel coding and such a rate matching as puncturing, repetition and the like may be performed. In doing so, the channel coding may be performed by such a channel coder as a turbo encoder, a tail bit convolution encoder and the like.

After completion of the channel coding process and the rate matching process, the $N_C$ code words may be mapped to $N_L$ layers. In this case, each of the layers may indicate a different information sent using MIMO technology and the number of the layers may not be greater than a rank that is the maximum number for sending different informations.

For reference, unlike such a general DL transmission scheme as OFDMA (Orthogonal Frequency Division Multiple Access), DFT may be performed on each layer for a UL signal transmitted by SC-FDMA (Single Carrier-Frequency Division Multiple Access) in order to enable a transmitted signal to have a single carrier property by canceling out an effect of IFFT (Inverse Fast Fourier Transform) in part.

The signals transformed by DFT in the layers are multiplied by a precoding matrix, are mapped to $N_T$ transmitting antennas, respectively, and are then transmitted to a base station through IFFT.

Generally, a common reference signal and a UE-specific reference signal may exist in a DL reference signal and precoding may not be applied to the common reference signal. In particular, the UE-specific reference signal is precoded by being inserted into a precoding part and is then transmitted to a user equipment side, in the same manner of normal data.

In order to implement spatial multiplexing transmission non-dependent on channel using a UE-specific reference signal, i.e., a dedicated reference signal, there exist several conditions. First of all, in order to reduce signaling overhead of a reference signal, a transmission reference signal should be precoded using the same precoding matrix of a modulated data symbol. Moreover, in order to obtain spatial channel diversity, a precoding matrix should be switched between antennas. Yet, since the dedicated reference signal is transmitted across a whole transmission resource region according to a specific rule or randomly, it may not be easy to meet the above conditions. Since channel measurement is performed by a unit of a specific number of resource elements for the efficiency of the channel measurement, it may be unable to change a precoding matrix for precoding a dedicated reference signal by a resource element unit.

Meanwhile, in order for a plurality of communication devices to transmit/receive data cooperatively in a multi-RAT system, a pre-procedure for exchanging information beforehand may be required.

In each step of the information exchanging pre-procedure, each of the communication devices may enter one of three statuses including a $1^{st}$ status of being disconnected from each other, a $2^{nd}$ status of recognizing and authenticating a counterpart communication device, and a $3^{rd}$ status of being associated with a counterpart communication device.

This may be described in detail with reference to Table 1 as follows.

TABLE 1

|  | Authentication | Association |
|---|---|---|
| 1st Status | X | X |
| 2nd Status | O | X |
| 3rd Status | O | O |

First of all, the 1st status may mean a status that a plurality of communication devices in a multi-RAT system are not connected to each other at all. Hence, in the 1st status, each source device should perform data communication with a base station in direct.

Secondly, the 2nd status may mean a status that information on a counterpart communication device is obtained and that the counterpart communication device is authenticated.

For example of a method of obtaining information on a counterpart communication device, there is a passive method of receiving information on a counterpart communication device via a beacon message or an active method including the steps of sending a probe request message and receiving information on a counterpart communication device via a probe response message received in response to the sent probe request message.

Having obtained the information on the counterpart communication device, each of the communication devices may complete an authentication confirmation job by exchanging an authentication frame (e.g., authentication request and authentication response) with the counterpart communication device.

If the authentication confirmation job is completed, each of the communication devices may enter the 2nd status.

Finally, the 3rd status may mean a status of being associated with an authenticated counterpart communication device.

In particular, each of the communication devices may complete an association job (e.g., AID assignment, etc.) by exchanging an association frame (e.g., association request and association response) with the counterpart communication device. If the association job of a plurality of the communication devices in the radio access system is completed, the communication devices may be able to transmit and receive their data.

In the above description, the statuses of the communication devices in the respective steps of the information exchanging pre-procedure are explained. In the following description, in order to help the understanding of the present invention, the respective steps of the information exchanging pre-procedure in the radio access system including a base station may be explained in detail.

First of all, an information exchanging step, which should be performed between a base station and a plurality of communication devices in a multi-RAT system, may mainly include 4 steps. In particular, the 4 steps may include a general network entering step, a negotiating step for a plurality of devices to cooperate with each other, a step of searching neighbor devices of a source device and selecting a cooperative device from the found neighbor devices, and a step of connecting to the selected cooperative device.

For clarity and convenience of the following description, assume that a subject per step of the information exchanging pre-procedure is a source device, by which the present invention may be non-limited. And, the substance of the present invention may be applicable to a device supporting a multi-RAT system, a cooperative device, a cooperative device candidate and the like per step.

Figure 11:
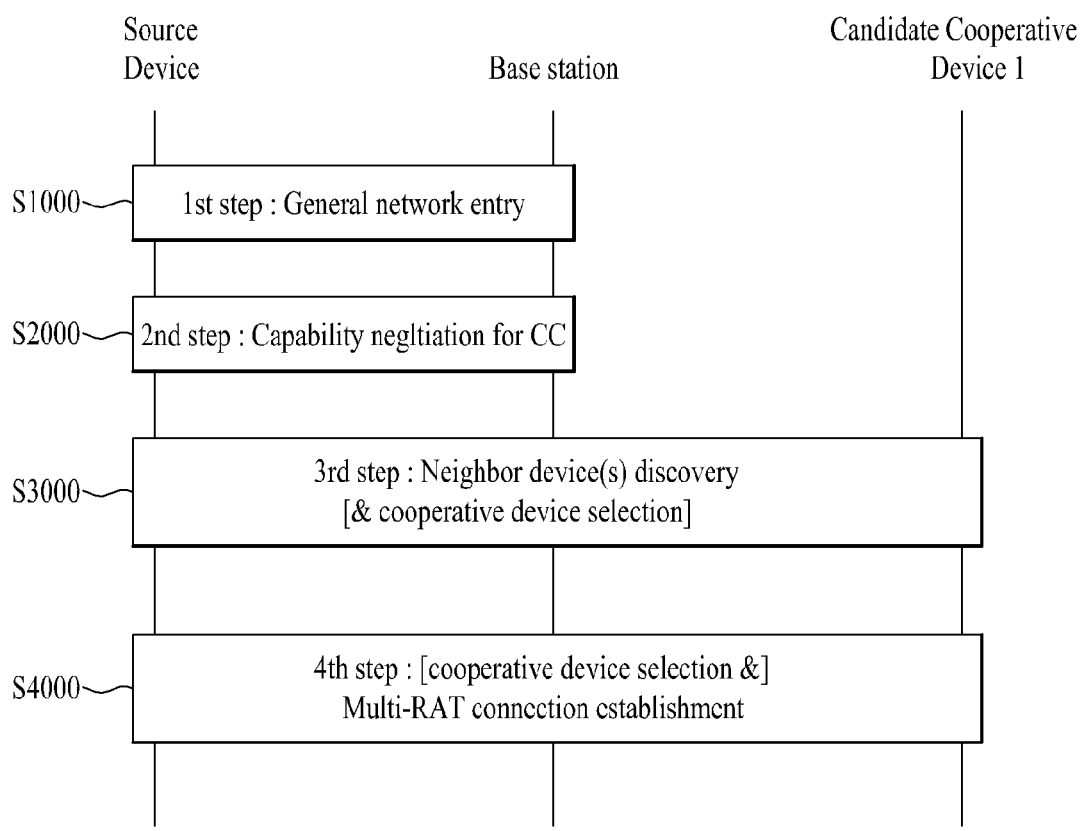
FIG. 11 is a diagram for one example of an information exchanging step requested to transmit/receive data between a base station and a plurality of devices in a multi-RAT (multi-radio access technology) system according to the present invention.

FIG. 11 is a diagram for one example of an information exchanging step requested to transmit/receive data between a base station and a plurality of devices in a multi-RAT (multi-radio access technology) system according to the present invention.

First of all, a source device may perform a general network entering step S1000 together with a base station. In particular, through the general network entering step S1000, the source device may be connected with the base station to transmit and receive data directly. For clarity and convenience of the following description, the general network entering step S1000 may be named a 1st step.

Subsequently, the source device having completed the 1st step together with the base station may perform a negotiating step S2000 to cooperate with a plurality of devices within the multi-RAT system. In the negotiating step S2000, the source device may negotiate with the base station for capability of a cooperative operation with the base station.

In doing so, information transceived between the base station and the source device may include connection RAT type information, system type information, system version information, location information, information on a presence or non-presence of possibility in playing a role as a cooperative device and the like.

For clarity and convenience of the following description, the negotiating step S2000 may be named a 2nd step.

Having performed the 2nd step, the base station, the source device and a plurality of the cooperative device candidates may perform a step S3000 of searching for neighbor devices and then selecting a cooperative device from the found neighbor devices. For clarity and convenience of the following description, assume that the step S3000 of selecting the cooperative device from the found neighbor devices may be named a 3rd step.

In the 3rd step, the base station, the source device and a plurality of the cooperative device candidates exchange their location informations with one another. Based on the exchanged location informations, a cooperative device to join a data communication within the multi-RAT system may be selected.

Having completed the 3rd step, the source device may perform a step S4000 of connecting with the selected cooperative device. If the step S4000 of connecting with the selected cooperative device is completed, the source device and the cooperative device, which are connected to each other, may cooperatively perform data transmission/reception to/from the base station.

For clarity and convenience of the following description, the step S4000 of connecting with the selected cooperative device may be named a 4th step.

In this case, each of the steps of the information exchanging pre-procedure may not be applied to all communication devices in common.

In particular, the 1st and 2nd steps should be performed in common by a plurality of the communication devices supporting the multi-RAT system. Yet, the 3rd and 4th steps may be performed by at least one of the source device, the cooperative device and the cooperative device candidate. And, it may be unnecessary for all communication devices to perform the 3rd step and the 4th step.

Occasionally, a portion of the 3rd step (e.g., obtaining the location informations of a plurality of the communication devices supporting the multi-RAT system) may be performed in common by all communication devices.

Thus, as all communication devices supporting the multi-RAT system should perform the 1st step and the 2nd step, the communication devices through the 1st and 2nd steps may not be identifiable from each other. The communication devices may be handled as preliminary source devices and preliminary cooperative devices through the $3^{rd}$ step. After completion of the $4^{th}$ step, the source device and the cooperative device are determined. Hence, the source device and the cooperative device may cooperative with each other to transceive data with the base station.

For clarity and convenience of the following description, assume that a method for a plurality of communication devices to cooperatively communicate with each other in a multi-RAT system may include an infrastructure basic service set (BSS) for performing communication using an access point (AP).

First of all, in order to perform efficient data communication with a base station, a source device may search for a plurality of cooperative device candidates capable of performing client cooperation to perform an efficient data communication with a base station and may then perform a client cooperation operation by selecting at least one cooperative device from a plurality of the found cooperative device candidates.

In doing so, since the source device has mobility, it may be necessary to periodically or aperiodically update information on a plurality of the cooperative device candidates located close to the source device. Namely, if a location of the source device is changed, a plurality of the cooperative device candidates capable of performing the client cooperation previously provided to the source device may be changed together.

In order to solve the above problem, the present invention may provide a following method. First of all, a plurality of devices receive AP information from an access point. Secondly, a base station receives the AP information from a plurality of the devices. Thirdly, the base station determines a cooperative device to perform a client cooperation from a plurality of cooperative device candidates using the received AP information. Finally, the base station transmits the information on the determined cooperative device to a source device.

In particular, the method provided by the present invention may be usefully applicable to a situation that a source device is unable to be connected to a found access point (AP) [i.e., a case of a service provider to which a source device is not accessible].

This may be described in detail with reference to FIG. 12 as follows.

Figure 12:
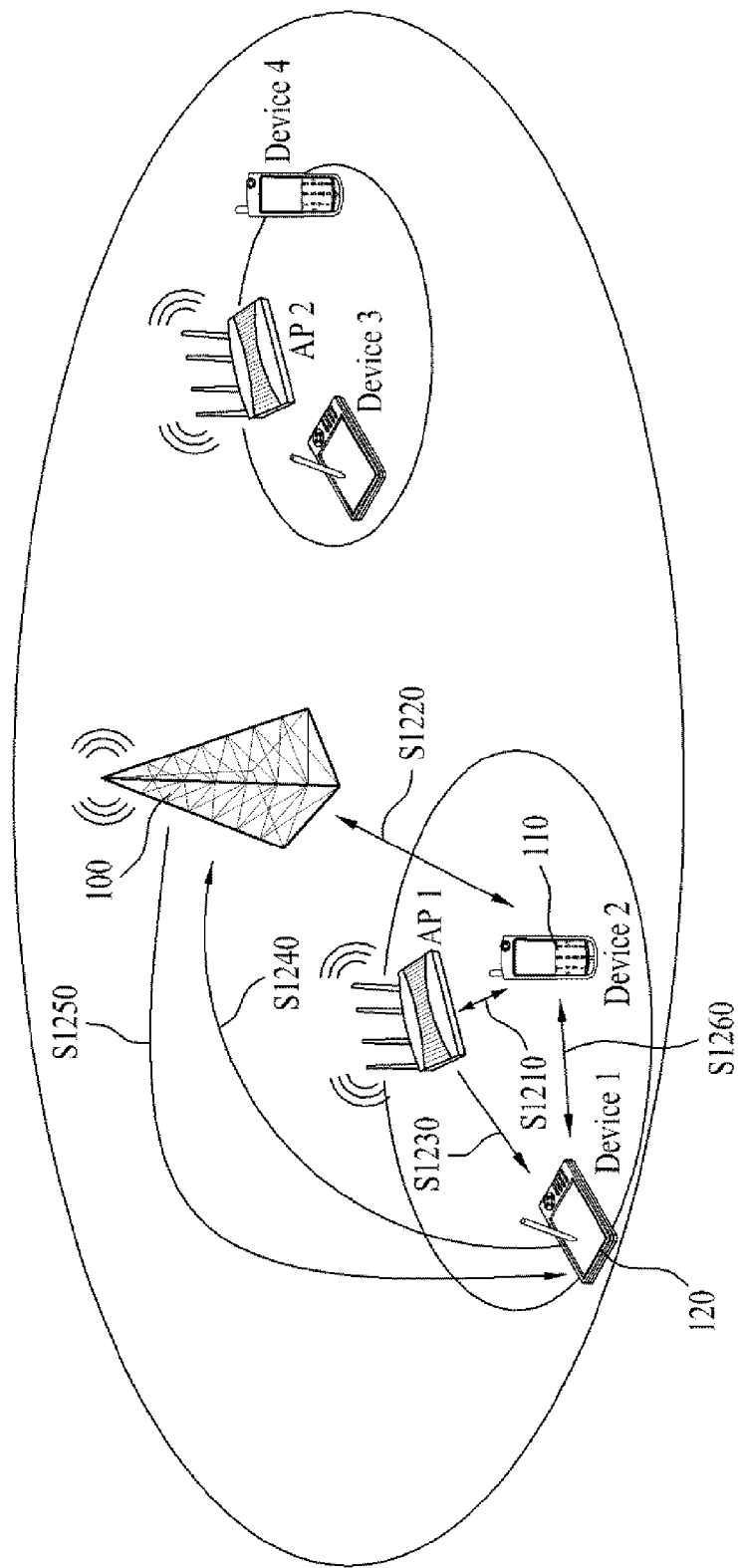
FIG. 12 is a diagram for one example of a step for a base station to determine a cooperative device for a client cooperation using an access point (AP) information according to the present invention.

FIG. 12 is a diagram for one example of a step for a base station to determine a cooperative device for a client cooperation using access point (AP) information according to the present invention.

For clarity and convenience of the following description, a client cooperation operation or an enhanced tethering operation in a multi-RAT system may be named a CC operation.

Referring to FIG. 12, a plurality of devices in a multi-RAT system may receive access point (AP) information from an access point (AP) located in the vicinity among a plurality of access points [S1210].

Subsequently, a base station 100 may determine a plurality of cooperative device candidates capable of performing a CC operation with a source device among a plurality of the devices in the multi-RAT system, may transmit a request for playing a role as a cooperative device candidate to each of a plurality of the determined cooperative device candidates, and may then receive AP information from each of the cooperative device candidates 110 having accepted the request [S1220].

Moreover, a source device 120 having mobility may receive AP information from an access point (AP) neighbor to a current location among a plurality of access points [S1230].

Having received the AP point from the access point (AP) located neighbor to the current location, the source device 120 may transmit the received AP information to the base station 100 [S1240].

Thereafter, the base station 100 may determine whether there is a same access point (AP) by comparing the AP information received from each of the cooperative device candidates 110 and the AP information received from the source device 120 to each other.

The base station 100 may transmit information on at least one or more cooperative device candidates located in the vicinity of the same access point of the source device among a plurality of the cooperative device candidates to the source device 120 [S1250].

Having received the information on the at least one or more cooperative device candidates, the source device 120 may obtain information on a plurality of cooperative device candidates existing close to the source device 120. Through this process, the source device 120 may update a list of a plurality of the cooperative device candidates periodically or aperiodically.

Therefore, the source device having mobility may periodically or aperiodically update the information on a plurality of the cooperative device candidates located close to the corresponding source device via the obtained information and may be able to smoothly perform a client cooperation (CC) operation.

In the following description, explained in detail are a method for a base station to determine a plurality of cooperative device candidates capable of performing the CC operation, a method for a plurality of cooperative device candidates to receive AP information from an access point (AP), a method for a base station to determine cooperative devices suitable for performing a CC operation together with a source device among a plurality of cooperative device candidates, and a method for a source device to monitor information on a cooperative device or a cooperative device candidate using an access point (AP).

A method for a base station to determine a plurality of cooperative device candidates capable of performing the CC operation may be described as follows.

First of all, a plurality of cooperative device candidates capable of performing a CC operation may be determined by a base station.

In consideration of information (e.g., support information) on whether a CC operation may be supportable in a multi-RAT system, moving speed information (e.g., no movement, movement at low speed, etc.), location information, information on a presence or non-presence of cooperative device candidate(s) in the vicinity and the number of the cooperative device candidate(s), retained power information, channel status information (e.g., status of high quality, etc.) and the like, the base station may determine whether a corresponding device may be able to perform the CC operation together with the corresponding device.

In doing so, only if some of a plurality of the above-enumerated informations meet the condition for performing the CC operation, the base station may make a request for a transmission of the rest of the informations to the corresponding device.

For instance, only if a channel status of the corresponding device supporting the CC operation within the multi-RAT system is good, the base station may be able to request the corresponding device to transmit the rest of the informations including the moving speed information, the location information, the information on a presence or non-presence of cooperative device candidate(s) in the vicinity and the number of the cooperative device candidate(s), the retained power information and the like.

In doing so, if the condition for the corresponding device to perform the CC operation is met, when the base station determines that the CC operation is necessary, the base station may request the corresponding device to play a role as a cooperative device candidate.

Having received the request for playing the role as the cooperative device candidate, the corresponding device may accept or reject the corresponding request.

In case that the corresponding device accepts the received request for playing the role as the cooperative device candidate, the corresponding device may transmit detailed information (e.g., system type in such a radio technology as IEEE 802.11a, IEEE 802.11b, IEEE 802.11g, 802.11n, etc., system version, MAC address, information on WiFi or Bluetooth, etc.) required for performing the CC operation to the base station.

In doing so, the corresponding device may transmit information on an access point (AP), which is received from the access point (AP) located in the vicinity, to the base station together with the detailed information.

In this case, the access point information may include a MAC address and a service set identifier (SSID) of the access point (AP), which is just exemplary. And, other informations necessary for the base station to identify each of a plurality of access points may be included in the access point information.

Thereafter, if the detailed information required for performing the CC operation is transmitted to the base station, the corresponding device may be able to play the role as the cooperative device candidate.

A method for a plurality of cooperative device candidates to receive AP information from an access point (AP) may be explained in detail as follows.

First of all, each of a plurality of access points may be able to transmit each access point (AP) information in accordance with a passive scan type or an active scan type.

According to the passive scan type, each of a plurality of access points may periodically transmit AP information to surroundings.

In doing so, the transmitted AP information may include such a notification signal as a beacon having the conventional IEEE 802.11 radio technology applied thereto and the like.

According to the active scan type, each of a plurality of cooperative device candidates may transmit an AP information request message to an unspecific or specific access point (AP). And, each of a plurality of access points may transmit an AP information response message containing AP information to a plurality of devices in response to the AP information request message.

For instance, if the conventional IEEE 802.11 radio technology is applied, the AP information request message and the AP information response message may include a probe request message and a probe response message, respectively.

The AP information received by a plurality of the cooperative device candidates may include a service set identifier (SSID) and MAC address of the access point (AP).

Each of a plurality of the cooperative device candidates may periodically perform an operation according to the passive or active scan type to receive the AP information.

For instance, the corresponding cooperative device candidate may periodically receive such a notification signal as a beacon or may be able to periodically perform an operation of transmitting a probe request message.

In case that each of a plurality of the cooperative device candidates accepts the request for playing the role as the cooperative device candidate, which was received from the base station, the corresponding device may transmit detailed information (e.g., system type in such a radio technology as IEEE 802.11a, IEEE 802.11b, IEEE 802.11g, 802.11n, etc., system version, MAC address, information on WiFi or Bluetooth, etc.) required for performing the CC operation to the base station together with the received AP information.

A process for transmitting AP information from an access point (AP) by handling a passive scan type or an active scan type differently may be described in detail with reference to the corresponding drawings as follows.

FIG. 13A to 13D are diagrams for one example of a notification signal transmission frame of a passive scan type according to the present invention.

First of all, according to a passive scan type, each of a plurality of access points may periodically transmit AP information to surroundings. And, the transmitted AP information may include a beacon notification signal to which the conventional IEEE 802.11 radio technology is applied.

FIGS. 13A to 13D show details of a frame body of a beacon notification signal.

Yet, FIGS. 13A to 13D are combined to construct one frame body instead of representing separate frame bodies. For clarity and convenience, one frame body is divided as shown in FIGS. 13A to 13D.

Referring to FIG. 13A, a service set identifier (SSID) field of an access point (AP) may be included in a frame body of a beacon notification signal.

And, a MAC address of the corresponding access point (AP) may be included in a MAC header.

FIG. 14A and FIG. 14B are diagrams for one example of a notification signal request transmission frame of an active scan type according to the present invention.

According to the active scan type, each of a plurality of devices may transmit an AP information request message to a corresponding access point (AP). And, the transmitted AP information request message may include a probe request message according to the conventional IEEE 802.11 radio technology.

FIG. 14A and FIG. 14B show details of a frame body of a probe request message according to the conventional IEEE 802.11 radio technology.

Yet, FIG. 14A and FIG. 14B are combined to construct one frame body instead of representing separate frame bodies. For clarity and convenience, one frame body is divided as shown in FIG. 14 and FIG. 14B.

FIGS. 15A to 15C are diagrams for one example of a notification signal response transmission frame transmitted by a corresponding access point (AP) in response to the probe request message.

If the active scan type and the conventional IEEE 802.11 radio technology are applied, a corresponding access point (AP) may be able to transmit a probe response message to a plurality of devices.

FIGS. 15A to 15C show details of a frame body of a probe response message.

Yet, FIGS. 15A to 15C are combined to construct one frame body instead of representing separate frame bodies. For clarity and convenience, one frame body is divided as shown in FIGS. 15A to 15C.

Referring to FIG. 15A, a service set identifier (SSID) field of an access point (AP) may be included in a frame body of a probe response message. And, a MAC address of the corresponding access point (AP) may be included in a MAC header.

Thereafter, a base station may determine whether there is a same access point (AP) by comparing AP information received from each of a cooperative device candidates and AP information received from a source device.

And, the base station may transmit information on at least one or more cooperative device candidates located in the vicinity of the same access point (AP) of the source device.

In doing so, the base station may be able to determine whether the source device and each of the cooperative device candidates are located within the same access point (AP) using the service set identifier (SSID) information of the access point (AP) received from each of the devices and the MAC access of the access point (AP).

Thereafter, the source device may be able to receive the information on the cooperative device candidates transmitted by the base station.

For clarity and convenience of the following description, the information on the cooperative device candidates transmitted by the base station shall be named cooperative device candidate information.

In order to retain a list of latest information on a cooperative device candidate, the source device may be able to periodically perform an operation of monitoring the cooperative device candidate information.

The cooperative device candidate information may include a MAC address of a corresponding cooperative device candidate, a location of the corresponding cooperative device candidate and the like.

The source device may update the cooperative device candidate list for performing a CC operation using the received cooperative device candidate information.

The source device may periodically report the updated cooperative device candidate list to the base station or may report the updated cooperative device candidate list in response to a request made by the base station.

In case of determining that a modified item exists in the received information list, the base station may be able to transmit the modified item to the corresponding source device.

If the passive scan type and the conventional IEEE 802.11 radio technology are applied and the source device does not receive a beacon notification signal of a corresponding access point (AP) for predetermined duration, the source device may exclude cooperative device candidates associated with the corresponding access point (AP) from the cooperative device candidate list.

If the active scan type and the conventional IEEE 802.11 radio technology are applied, the source device may be able to transmit a probe request message to the corresponding access point (AP) each predetermined timing point.

If a probe response message is not received over a preset count from the corresponding access point (AP), the source device may be able to exclude cooperative device candidates associated with the corresponding access point (AP) from the cooperative device candidate list.

Through the above-mentioned method, since the source device having mobility is able to update the information on a plurality of cooperative device candidates existing close to the source device periodically or aperiodically, it may be able to smoothly perform a client cooperation operation.

Figure 16:
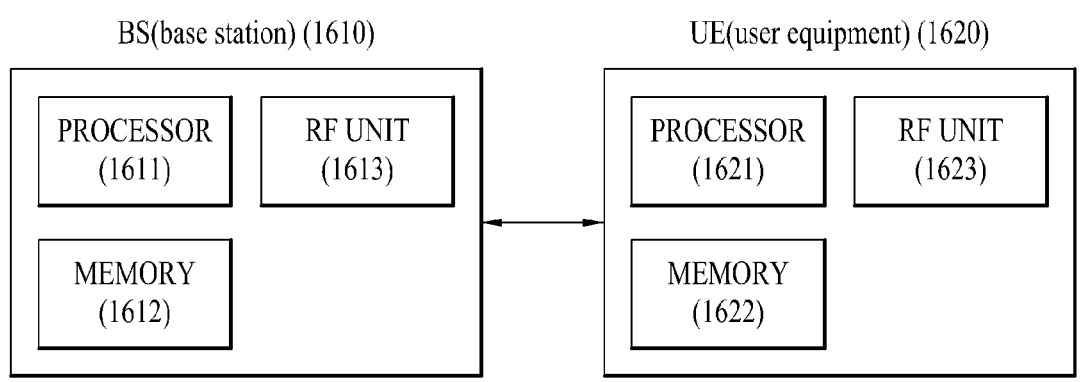
FIG. 16 is a block diagram for one example of a base station and a user equipment according to the present invention.

FIG. 16 is a block diagram of configurations of a base station apparatus 1610 and a communication apparatus 1620 supporting a multi-RAT system according to one preferred embodiment of the present invention. In the above description, such a terminology as a user equipment, a communication device and a communication apparatus has been interchangeably used. Yet, in order to prevent the confusion in using terminology, such a terminology may be named a user equipment apparatus in the following description.

Referring to FIG. 16, a base station apparatus 1610 according to the present invention may include a receiving module 1611, a transmitting module 1612, a processor 1613, a memory 1614 and a plurality of antennas 1615. A plurality of the antennas 1615 may mean the base station apparatus supporting MIMO transmission and reception. The receiving module 1611 may be able to receive various signals, data and informations in UL from a user equipment. The transmitting module 1612 may be able to transmit various signals, data and informations in DL to the user equipment. And, the process 1613 may be able to control overall operations of the base station apparatus 1610.

In consideration of information (e.g., support information) on whether a CC operation may be supportable in a multi-RAT system, moving speed information (e.g., no movement, movement at low speed, etc.), location information, information on a presence or non-presence of cooperative device candidate(s) in the vicinity and the number of the cooperative device candidate(s), retained power information, channel status information (e.g., status of high quality, etc.) and the like, the processor 1613 of the base station apparatus 1610 may determine whether the corresponding device may be able to perform the CC operation together with the source device. The processor 1613 may be then able to determine a cooperative device candidate.

The processor 1613 of the base station apparatus 1610 may be able to determine whether there is a same access point (AP) by comparing AP information received from each cooperative device candidate and AP information received from a source device to each other.

The processor 1613 of the base station apparatus 1610 may be able to control information on at least one or more cooperative device candidates, which are located in the vicinity of the same access point (AP) of the source device among a plurality of cooperative device candidates, to be transmitted to the source device.

The processor 1613 of the base station apparatus 1610 may also perform a function of operating information received by the base station apparatus 1610, information to be transmitted by the base station apparatus 1610 and the like. And, the memory 1614 may be able to store the operated information and the like for prescribed duration and may be substituted with such a component as a buffer (not shown in the drawing) and the like.

Referring to FIG. 16, a user equipment apparatus 1620 according to the present invention may include a receiving module 1621, a transmitting module 1622, a processor 1623, a memory 1624 and a plurality of antennas 1625. A plurality of the antennas 1625 may mean the user equipment apparatus supporting MIMO transmission and reception. The receiving module 1621 may be able to receive various signals, data and informations in DL from a base station. The transmitting module 1622 may be able to transmit various signals, data and informations in UL to the base station. And, the process 1623 may be able to control overall operations of the user equipment apparatus 1620.

The processor 1623 of the user equipment apparatus 1620 may be able to control AP information to be received from an access point (AP) in the vicinity of a current location among a plurality of access points.

The processor 1623 of the user equipment apparatus 1620 may control an operation of monitoring cooperative device candidate information to be periodically performed to retain a latest information list of cooperative device candidates.

The processor 1623 of the user equipment apparatus 1620 may be able to update a cooperative device candidate list for performing a CC operation using the received cooperative device candidate information.

The processor 1623 of the user equipment apparatus 1620 may also perform a function of operating information received by the user equipment apparatus 1620, information to be transmitted by the user equipment apparatus 1620 and the like. The memory 1624 may be able to store the operated information and the like for prescribed duration and may be substituted with such a component as a buffer (not shown in the drawing) and the like.

The above-described detailed configurations of the base station apparatus and the user equipment apparatus may be implemented in a manner that the above-mentioned descriptions of the embodiments of the present invention are independently applied or that at least two of the embodiments of the present invention are simultaneously applied. And, the redundant contents may be omitted for clarity.

In the description with reference to FIG. 16, the description of the base station apparatus 1610 may be identically applicable to a relay apparatus as a DL transmission subject or a UL reception subject. And, the description of the user equipment apparatus 1620 may be identically applicable to a relay apparatus as a DL reception subject or a UL transmission subject.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention may be applicable to such a system as a multi-RAT system, a wireless communication system and the like. In particular the present invention may be applicable to a wireless mobile communication apparatus used for a cellular system.

The invention claimed is:

1. A method of performing a communication, which is performed by a user equipment based on an access point (AP) supporting a Multi-RAT (Radio Access Technology), comprising the steps of:
   receiving an information on a $1^{st}$ AP associated with the user equipment from the $1^{st}$ AP;
   transmitting the information on the $1^{st}$ AP to a base station;
   receiving an information on at least one cooperative user equipment associated with the $1^{st}$ AP from the base station; and
   transmitting a $1^{st}$ data to the base station using the at least one cooperative user equipment,
   wherein the $1^{st}$ data is exchanged between the user equipment and the at least one cooperative user equipment via a $1^{st}$ radio access scheme and
   wherein the $1^{st}$ data is exchanged between the at least one cooperative user equipment and the base station via a $2^{nd}$ radio access scheme.

2. The method of claim 1, further comprising generating and updating a list of cooperative user equipment based on the information on at least one cooperative user equipment associated with the $1^{st}$ AP.

3. The method of claim 1, wherein the $1^{st}$ radio access scheme is WiFi (wireless fidelity) access scheme and wherein the $2^{nd}$ radio access scheme is WiMAX (worldwide interoperability for microwave access) scheme.

4. The method of claim 1, wherein the information on the $1^{st}$ AP includes at least one selected from the group consisting of a MAC (medium access control) address information and an SSID (service set identifier) information.

5. The method of claim 1, wherein the information on the $1^{st}$ AP is periodically received from the $1^{st}$ AP.

6. The method of claim 1, further comprising transmitting a probe request message to the $1^{st}$ AP from the user equipment, wherein the information on the $1^{st}$ AP is received via a probe response message in response to the transmitted probe request message.

7. The method of claim 1, further comprising the step of periodically monitoring whether the information on the at least one cooperative user equipment is received.

8. The method of claim 1, wherein the information on the at least one cooperative user equipment associated with the $1^{st}$ AP has been transmitted, by the at least one cooperative user equipment, to the base station in response to an activation request message received from the base station.

9. A method of performing a communication, which is performed by a base station based on an access point (AP) supporting a Multi-RAT (Radio Access Technology), comprising the steps of:
- receiving an information on an AP associated with each of a plurality of cooperative user equipments from the plurality of the cooperative user equipments;
- receiving an information on a $1^{st}$ AP among a plurality of APs from a user equipment, wherein the $1^{st}$ AP is associated with the user equipment; and
- transmitting an information on at least one cooperative user equipment associated with the $1^{st}$ AP among the plurality of APs to the user equipment,
- wherein the base station exchanges a $1^{st}$ data with the user equipment using the at least one cooperative user equipment,
- wherein the $1^{st}$ data is exchanged between the user equipment and the at least one cooperative user equipment via a $1^{st}$ radio access scheme, and
- wherein the $1^{st}$ data is exchanged between the at least one cooperative user equipment and the base station via a $2^{nd}$ radio access scheme.

10. The method of claim 9, further comprising the step of directly receiving a $2^{nd}$ data from the user equipment via the $2^{nd}$ radio access scheme.

11. The method of claim 9, wherein the $1^{st}$ radio access scheme is WiFi (wireless fidelity) access scheme and wherein the $2^{nd}$ radio access scheme is WiMAX (worldwide interoperability for microwave access) scheme.

12. The method of claim 9, wherein the at least one cooperative user equipment is determined by the base station using at least one selected from the group consisting of information on whether a client cooperation operation is supportable, moving speed information, location information, retained power information, channel status information and information on a presence or non-presence of neighbor cooperative user equipment(s) in the vicinity and the number of neighbor cooperative user equipment(s).

13. A user equipment, which is based on an access point (AP) supporting a Multi-RAT (Radio Access Technology), comprising:
- a receiving module receiving an information on a $1^{st}$ AP associated with the user equipment from the $1^{st}$ AP, the receiving module receiving an information on at least one cooperative user equipment associated with the $1^{st}$ AP from a base station;
- a transmitting module transmitting the information on the $1^{st}$ AP to the base station, the transmitting module transmitting a $1^{st}$ data to the base station using the at least one cooperative user equipment; and
- a processor controlling the $1^{st}$ data to be exchanged between the user equipment and the at least one cooperative user equipment via a $1^{st}$ radio access scheme, the processor controlling the $1^{st}$ data to be exchanged between the at least one cooperative user equipment and the base station via a $2^{nd}$ radio access scheme.

14. A base station, which is based on an access point (AP) supporting a Multi-RAT (Radio Access Technology), comprising:
- a receiving module receiving an information on an AP associated with each of a plurality of cooperative user equipment from the plurality of the cooperative user equipment, the receiving module receiving an information on a $1^{st}$ AP from a user equipment, wherein the $1^{st}$ AP is associated with the user equipment;
- a transmitting module transmitting an information on at least one cooperative user equipment associated with the $1^{st}$ AP to the user equipment; and
- a processor controlling the base station to exchange a $1^{st}$ data with the user equipment using the at least one cooperative user equipment, the processor controlling the $1^{st}$ data to be exchanged between the user equipment and the at least one cooperative user equipment via a $1^{st}$ radio access scheme, the processor controlling the $1^{st}$ data to be exchanged between the at least one cooperative user equipment and the base station via a $2^{nd}$ radio access scheme.

* * * * *